US008936510B1

(12) United States Patent
Chen

(10) Patent No.: US 8,936,510 B1
(45) Date of Patent: Jan. 20, 2015

(54) BETTING TRIP GAME

(71) Applicant: Yi Chen, Los Angeles, CA (US)

(72) Inventor: Yi Chen, Los Angeles, CA (US)

( * ) Notice: Subject to any disclaimer, the term of this patent is extended or adjusted under 35 U.S.C. 154(b) by 0 days.

(21) Appl. No.: 13/999,479

(22) Filed: Mar. 4, 2014

(51) Int. Cl.

| | |
|---|---|
| ***A63F 9/24*** | (2006.01) |
| ***A63F 13/00*** | (2014.01) |
| ***A63F 3/00*** | (2006.01) |
| ***G07F 17/32*** | (2006.01) |

(52) U.S. Cl.
CPC .......... *A63F 3/00157* (2013.01); *G07F 17/329* (2013.01)
USPC .................... 463/25; 273/243; 463/9; 463/16

(58) Field of Classification Search
USPC ......................................... 463/9, 16; 273/242
See application file for complete search history.

(56) References Cited

U.S. PATENT DOCUMENTS

| | | | | |
|---|---|---|---|---|
| 5,823,872 A * | 10/1998 | Prather et al. | 463/6 |
| 5,839,726 A * | 11/1998 | Luise | 273/246 |
| 6,162,121 A | 12/2000 | Morro et al. | |
| 6,679,495 B1 | 1/2004 | Endelicato | |
| 6,702,668 B2 | 3/2004 | Banyai | |
| 7,163,458 B2 * | 1/2007 | Schugar | 463/16 |
| 7,172,506 B2 | 2/2007 | Baerlocher et al. | |
| 7,510,116 B2 | 3/2009 | Robb et al. | |
| 8,062,114 B2 | 11/2011 | Bennett | |
| 8,226,464 B2 | 7/2012 | Kim | |
| 8,317,605 B2 | 11/2012 | Bramble | |
| 8,360,861 B2 | 1/2013 | McKay et al. | |
| 2002/0082071 A1 | 6/2002 | Riendeau et al. | |
| 2003/0212623 A1 | 11/2003 | Aylmer et al. | |
| 2005/0070353 A1 | 3/2005 | Webb et al. | |
| 2006/0211472 A1 * | 9/2006 | Walker et al. | 463/16 |
| 2009/0011812 A1 | 1/2009 | Katz et al. | |
| 2010/0130277 A1 | 5/2010 | Miller et al. | |
| 2010/0295245 A1 * | 11/2010 | Klamer | 273/243 |
| 2011/0065490 A1 | 3/2011 | Lutnick | |
| 2011/0287822 A1 | 11/2011 | Walker et al. | |
| 2011/0287823 A1 * | 11/2011 | Guinn et al. | 463/19 |
| 2012/0094747 A1 | 4/2012 | Visser | |
| 2012/0244932 A1 | 9/2012 | DeWaal et al. | |
| 2012/0309482 A1 | 12/2012 | Bennett | |

* cited by examiner

*Primary Examiner* — Steven J Hylinski

(57) ABSTRACT

A method to operate game of chance using a map of sites as playing surface with moving pieces called movers. There are ruled movements. A random draw of ruled movements move movers from sites to sites. Players bet on own selected movers moving to own selected sits by one or several draws of movements. The holder of a hanging bet earns credit to place free make-up bets. Calculation of the hanging or winning probability of every bet together with its hanging credit or winning payoff will be provided. An automatic computer/video version of the game is included.

7 Claims, 27 Drawing Sheets

Ticket #2001

Ticket #2001

Simple Bets Draw 1 is Draw #67
Draw 1: 2-3-2-1-5-3 Draw 2: 5-2-2-2-3-1 Draw 3: 2-2-3-3-3-2 Draw 4: 4-1-2-2-3-2
Total bets:16+15+15+14=50 $1 per bet Total amount: $50

①=Dad ②=Mom ③=Ann ④=Bob ⑤=Eva ⑥=Me
A=Moon B=Mt Everest C=Old Faithful D=Mt Denali
E=Pisa Leaning Tower F=Victoria Falls G=Ghost Town Ticket #2002

Site Bets Draw 1 is Draw #67
Draw 1: 7 Draw 2: 6 Draw 3: 7 Draw 4: 5
Total bets: 7+6+7+5=25 $2 per bet Total amount: $50

①=Dad ②=Mom ③=Ann ④=Bob ⑤=Eva ⑥=Me
A=Moon B=Mt Everest C=Old Faithful D=Mt Denali
E=Pisa Leaning Tower F=Victoria Falls G=Ghost Town Ticket #2003

Mixed Bets Draw 1 is Draw #67
Draw 1: 2-3-2-1-5-3 Draw 2: 5-2-2-2-3-1 Draw 3: 2-2-3-3-3-2 Draw 4: 4-1-2-2-3-2
Total bets: 2*3*2*5*3+5*2*2*2*3+2*2*3*3*3*2+4*2*2*3*2=180+120+216+96=622
Total amount: $100

①=Dad ②=Mom ③=Ann ④=Bob ⑤=Eva ⑥=Me
A=Moon B=Mt Everest C=Old Faithful D=Mt Denali
E=Pisa Leaning Tower F=Victoria Falls G=Ghost Town Ticket #2004

4-Draw Bets Draw 1 is Draw #67
Total bets: (4*4*5*5)*(3*2*4*4)*(3*4*3*3)*(2*2*2*2)=6,777,600
Total amount: $200

Credit percentage 99
Draw 2: 10, 20, 30, 40, 50, 60, 70, 80, 90 new slip
Draw 3: 10, 20, 30, 40, 50, 60, 70, 80, 90 new slip
Draw 4: 10, 20, 30, 40, 50, 60, 70, 80, 90 new slip (1)=Dad (2)=Mom (3)=Ann (4)=Bob (5)=Eva (6)=Me
A=Moon B=Mt Everest C=Old Faithful D=Mt Denali
E=Pisa Leaning Tower F=Victoria Falls G=Ghost Town

Ticket #2004

4-Draw Bets Draw 1 is Draw #67

Total bets: (4*4*5*5)*(3*2*4*4)*(3*4*3*3)*(2*2*2*2)=6,777,600

Total amount: $200

Credit percentage

Draw 2: 99 70

Draw 3: [10], [20], [30], [40], [50], [60], [70], [80], [90] [new slip]

Draw 4: [10], [20], [30], [40], [50], [60], [70], [80], [90] [new slip]

①=Dad ②=Mom ③=Ann ④=Bob ⑤=Eva ⑥=Me

A=Moon B=Mt Everest C=Old Faithful D=Mt Denali

E=Pisa Leaning Tower F=Victoria Falls G=Ghost Town

Ticket #2004

4-Draw Bets Draw 1 is Draw #67
Total bets: (4*4*5*5)*(3*2*4*4)*(3*4*3*3)*(2*2*2*2)=6,777,600
Total amount: $200

Credit percentage
Draw 2: 70
Draw 3: 99 60
Draw 4: [10], [20], [30], [40], [50], [60], [70], [80], [90] [new slip]

①=Dad ②=Mom ③=Ann ④=Bob ⑤=Eva ⑥=Me
A=Moon B=Mt Everest C=Old Faithful D=Mt Denali
E=Pisa Leaning Tower F=Victoria Falls G=Ghost Town

Ticket #2004

4-Draw Bets Draw 1 is Draw #67
Total bets: (4*4*5*5)*(3*2*4*4)*(3*4*3*3)*(2*2*2*2)=6,777,600
Total amount: $200

Credit percentage
Draw 2: 70
Draw 3: 60
Draw 4: 80

(1)=Dad (2)=Mom (3)=Ann (4)=Bob (5)=Eva (6)=Me
A=Moon B=Mt Everest C=Old Faithful D=Mt Denali
E=Pisa Leaning Tower F=Victoria Falls G=Ghost Town Ticket #3001 Official Results Draw #33

① =Tim ②=Joe ③=Son ④=Bob ⑤=Sam ⑥=Me

A=Toys B=Jewelry C=Candy D=Sportware E=Shoes
F=Cafe G=Cinema H=Arcade K=CD/DVD L=Cameras Simple Bets Draw 1 is Draw #34
Draw 1: 4-3-2-5-2-3 Draw 2: 2-4-3-5-1-3 Draw 3: 1-4-2-2-3-3 Draw 4: 2-4-3-2-5-2
Total bets: 19+18+15+18=70 Amount per bet: $2 Total amount: $140

Ticket #3002 Official Results Draw #33

①=Tim ②=Joe ③=Son ④=Bob ⑤=Sam ⑥=Me

A=Toys B=Jewelry C=Candy D=Sportware E=Shoes
F=Cafe G=Cinema H=Arcade K=CD/DVD L=Cameras Site Bets Draw 1 is Draw #34
Draw 1: 10 Draw 2: 10 Draw 3: 9 Draw 4: 10
Total bets: 10+10+9+10=39 Amount per bet: $2 Total amount: $78

Ticket #3003 Official Results Draw #33

① =Tim ②=Joe ③=Son ④=Bob ⑤=Sam ⑥=Me

A=Toys B=Jewelry C=Candy D=Sportware E=Shoes
F=Cafe G=Cinema H=Arcade K=CD/DVD L=Cameras Mixed Bets Draw 1 is Draw #34

Draw 1: 4-3-2-5-2-3 Draw 2: 2-4-3-5-1-3 Draw 3: 1-4-2-2-3-3 Draw 4: 2-4-3-2-5-2

Total bets: (4*3*2*5*2*3)+(2*4*3*5*1*3)+(1*4*2*2*3*3)+( 2*4*3*2*5*2)=1,704

Amount per bet: $0.10 Total amount: $170.40

Ticket #3004

Official Results Draw #33

① =Tim ②=Joe ③=Son ④=Bob ⑤=Sam ⑥=Me

A=Toys B=Jewelry C=Candy D=Sportware E=Shoes
F=Cafe G=Cinema H=Arcade K=CD/DVD L=Cameras 3-Draw Bets Draw 1 is Draw #34
Total bets: (5*5*5*5*5)*(4*4*4*4*4)*(3*2*3*2*3)=172,800,000
Total bet amount: $200

Credit percentage
Draw 2: 99 70
Draw 3: [10], [20], [30], [40], [50], [60], [70], [80], [90] [new slip]

Ticket #3004

Official Results Draw #33

(1)=Tim (2)=Joe (3)=Son (4)=Bob (5)=Sam (6)=Me

A=Toys B=Jewelry C=Candy D=Sportware E=Shoes
F=Cafe G=Cinema H=Arcade K=CD/DVD L=Cameras 3-Draw Bets Draw 1 is Draw #34
Total bets: (5*5*5*5*5)*(4*4*4*4*4)*(3*2*3*2*3)=172,800,000
Total bet amount: $200

Credit percentage
Draw 2: 70
Draw 3: 80

Ticket #4001

Official Results Draw #66

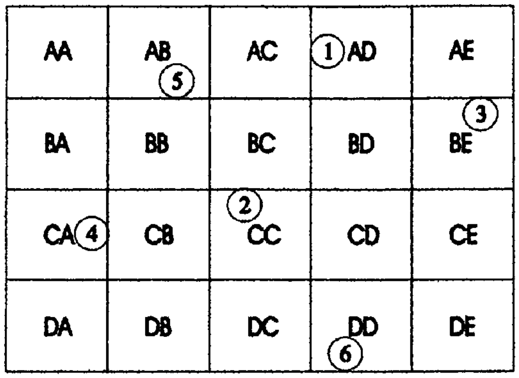

1=Ann 2= Bob 3=Carl 4=David 5=Eva 6=Me

AA=Auditorium AB=Library AC=Prinicipal's office AD=Reading room AE=Gym
BA=Cafeteria BB=Meeting room BC=Class room BD=Rest room BE=Dormetory
CA=Stadium CB=Computer room CC=Music hall CD=Bus stop CE=Tennis court
DA=Parking lot DB=Swimming pool DC=Lab DD=Baseball yard DE=Locker room

Simple Bets Draw 1 is Draw #67

Draw 1: 7-0-8-6-2-4, Draw 2: 0-4-3-4-5-0, Draw 3: 8-1-0-0-3-7, Draw 4: 6-1-4-3-0-5

Total bets: 27+16+19+19=81

$1 per bet, Total amount: $27+$16+$19+$19=$81

Draw 1

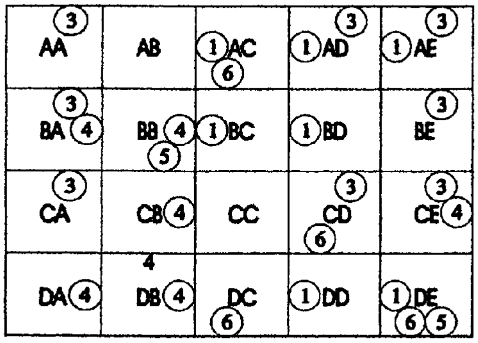

Draw 2

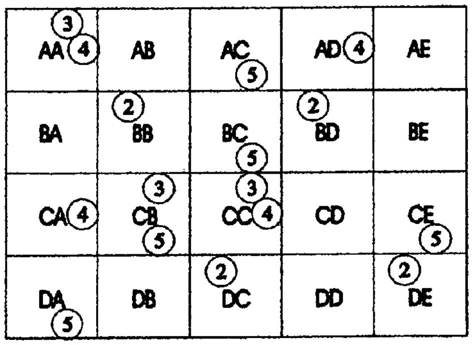

Draw 3

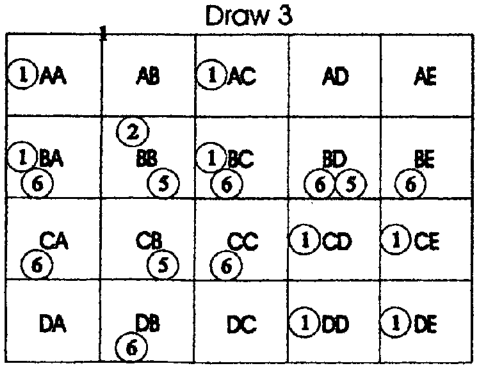

Draw 4

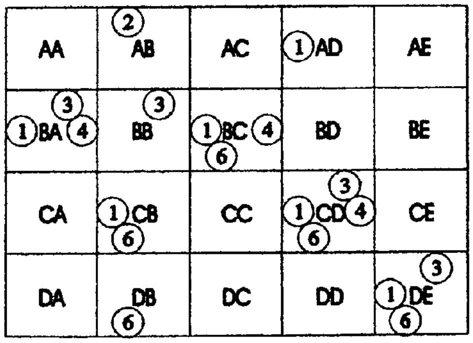

FIG. 4B

Ticket #4002 Official Results Draw #66

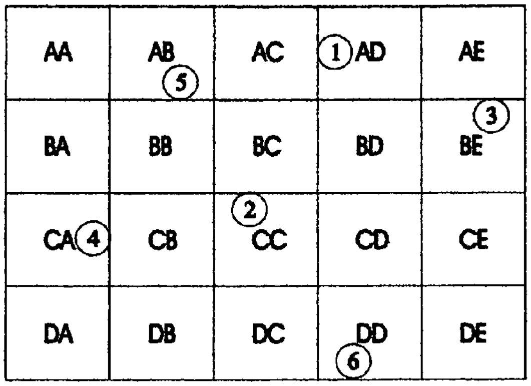

①=Ann ②= Bob ③=Carl ④=David ⑤=Eva ⑥=Me
AA=Auditorium AB=Library AC=Prinicipal's office AD=Reading room AE=Gym
BA=Cafeteria BB=Meeting room BC=Class room BD=Rest room BE=Dormetory
CA=Stadium CB=Computer room CC=Music hall CD=Bus stop CE=Tennis court
DA=Parking lot DB=Swimming pool DC=Lab DD=Baseball yard DE=Locker room Site Bets Draw 1 is Draw #67
Draw 1: 18, Draw 2: 13, Draw 3: 15, Draw 4: 9
Total bets: 18+13+15+9=55
$2 per bet, Total amount: $36+$26+$30+$18=$110

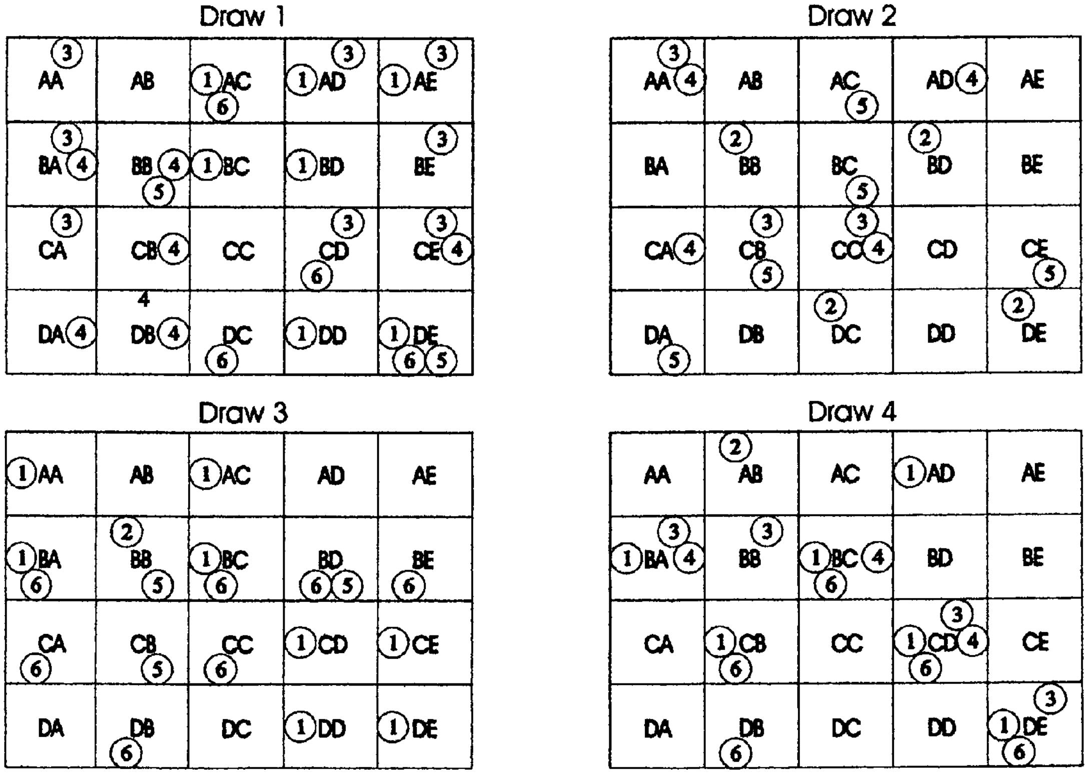

FIG. 4C

Ticket #4003

Official Results Draw #66

| | | | | |
|---|---|---|---|---|
| AA | AB (5) | AC | (1) AD | AE |
| BA | BB | BC | BD | BE (3) |
| CA (4) | CB | (2) CC | CD | CE |
| DA | DB | DC | DD (6) | DE |

(1)=Ann (2)= Bob (3)=Carl (4)=David (5)=Eva (6)=Me

AA=Auditorium AB=Library AC=Prinicipal's office AD=Reading room AE=Gym
BA=Cafeteria BB=Meeting room BC=Class room BD=Rest room BE=Dormetory
CA=Stadium CB=Computer room CC=Music hall CD=Bus stop CE=Tennis court
DA=Parking lot DB=Swimming pool DC=Lab DD=Baseball yard DE=Locker room Mixed Bets Draw 1 is Draw #67

Draw 1: 7-0-8-6-2-4, Draw 2: 0-4-3-4-5-0, Draw 3: 8-1-0-0-3-7, Draw 4: 6-1-4-3-0-5

Total bets: (7*8*6*2*4)+(4*3*4*5)+(8*1*3*7)+(6*1*4*3*5)=3,456

$0.10 per bet Total amount: $345.60

Draw 1

| | | | | |
|---|---|---|---|---|
| (3) AA | AB | (1) AC (6) | (1) AD (3) | (1) AE (3) |
| (3) BA (4) | BB (4) (5) | (1) BC | (1) BD | (3) BE |
| (3) CA | CB (4) | CC | (3) CD (6) | (3) CE (4) |
| DA (4) | 4 DB (4) | DC (6) | (1) DD | (1) DE (6) (5) |

Draw 2

| | | | | |
|---|---|---|---|---|
| (3) AA (4) | AB | AC (5) | AD (4) | AE |
| BA | (2) BB | BC (5) | (2) BD | BE |
| CA (4) | (3) CB (5) | (3) CC (4) | CD | CE (5) |
| DA (5) | DB | (2) DC | DD | (2) DE |

Draw 3

| | | | | |
|---|---|---|---|---|
| (1) AA | AB | (1) AC | AD | AE |
| (1) BA (6) | (2) BB (5) | (1) BC (6) | BD (6) (5) | BE (6) |
| CA (6) | CB (5) | CC (6) | (1) CD | (1) CE |
| DA | DB (6) | DC | (1) DD | (1) DE |

Draw 4

| | | | | |
|---|---|---|---|---|
| AA | (2) AB | AC | (1) AD | AE |
| (3) (1) BA (4) | (3) BB | (1) BC (4) (6) | BD | BE |
| CA | (1) CB (6) | CC | (3) (1) CD (4) (6) | CE |
| DA | DB (6) | DC | DD | (3) (1) DE (6) |

FIG. 4D

Ticket #4004 Official Results Draw #66

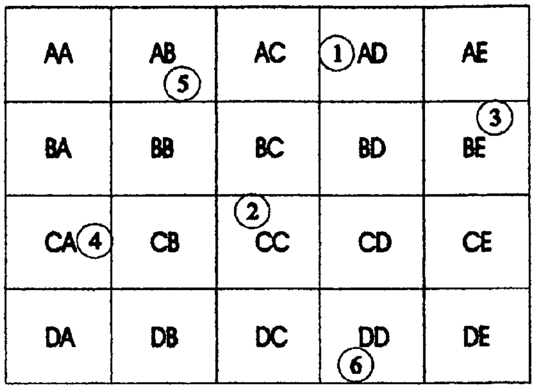

①=Ann ②= Bob ③=Carl ④=David ⑤=Eva ⑥=Me

AA=Auditorium AB=Library AC=Prinicipal's office AD=Reading room AE=Gym
BA=Cafeteria BB=Meeting room BC=Class room BD=Rest room BE=Dormetory
CA=Stadium CB=Computer room CC=Music hall CD=Bus stop CE=Tennis court
DA=Parking lot DB=Swimming pool DC=Lab DD=Baseball yard DE=Locker room Chain Bets Draw 1 is Draw #67
Total bets: (8*8*8*7)*(7*7*6*6)*(6*5*5*5)=4,741,623,000
Total bet amount: $200

Credit percentage
Draw 2: 99 60
Draw 3: [10], [20], [30], [40], [50], [60], [70], [80], [90] [new slip]

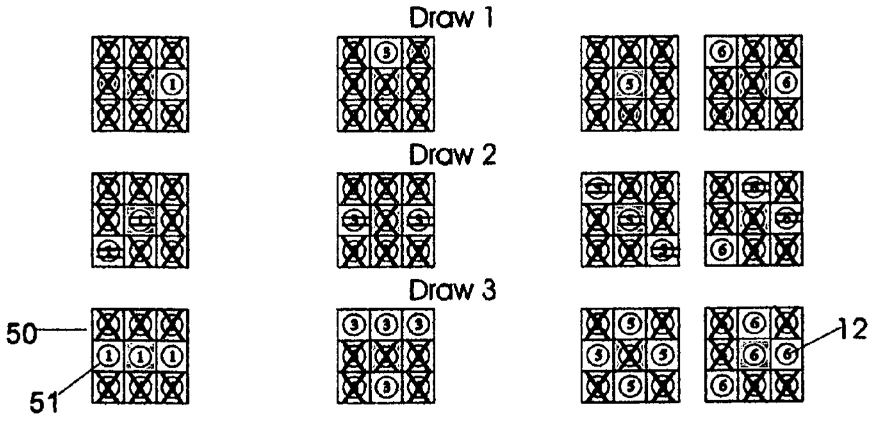

FIG. 4F

Ticket #4004 Official Results Draw #66

| | | | | |
|---|---|---|---|---|
| AA | AB ⑤ | AC | ① AD | AE |
| BA | BB | BC | BD | ③ BE |
| CA ④ | CB | ② CC | CD | CE |
| DA | DB | DC | DD ⑥ | DE |

①=Ann ②= Bob ③=Carl ④=David ⑤=Eva ⑥=Me

AA=Auditorium AB=Library AC=Prinicipal's office AD=Reading room AE=Gym
BA=Cafeteria BB=Meeting room BC=Class room BD=Rest room BE=Dormetory
CA=Stadium CB=Computer room CC=Music hall CD=Bus stop CE=Tennis court
DA=Parking lot DB=Swimming pool DC=Lab DD=Baseball yard DE=Locker room Chain Bets Draw 1 is Draw #67
Total bets: (8*8*8*7)*(7*7*6*6)*(6*5*5*5)=4,741,623,000
Total bet amount: $200

Credit percentage
Draw 2: 60
Draw 3: 70

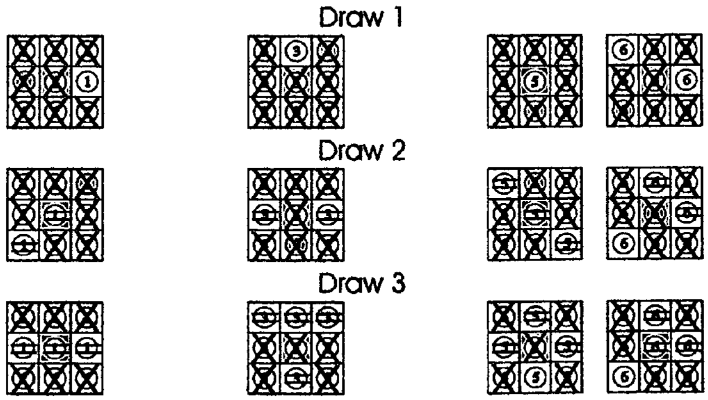

FIG. 4G

Account xxx

Balance $xxx.xx
credit voucher #001, index xxxxxx

| Ticket | Type | Status | Payout |
|---|---|---|---|
| #1001 | Chain | finished | nil |
| #1002 | simple | unfinished | $xx.xx |
| #1003 | site | finished | $xx.xx |
| #1004 | mixed | unfinished | nil |
| #1005 | Chain | hanging | $xx.xx |

[Bet slip] [Playing surface] [Exit]

$e(x)=2.5+x/4$ for $1=<x<=10$ $e(x)=4+(n+1)[n/2+(x-10^n)/9(10^n)]$ for $10<x$ with integer n satisfying $10^n<x<=10^{n+1}$

BETTING TRIP GAME

CROSS REFERENCE TO RELATED APPLICATIONS

This is a continuation application of application Ser. No. 13/815,185, filed on Feb. 7, 2013, to be abandoned as this is filed. Application Ser. No. 13/815,18 is related to application Ser. No. 12/589,989 filed on Nov. 2, 2009, now abandoned, which is a continuation application of Ser. No. 11/299,050 filed on Dec. 12, 2005, also abandoned. This and all abandoned applications use the frame work of application 691, 944, filed on Aug. 5, 1996, now U.S. Pat. No. 5,795,226, granted on Aug. 18, 1998. The inventor's name was misprinted as Chen Yi. A certificate of correction was issued on Nov. 24, 1998.

BACKGROUND OF THE INVENTION

1. Field of Invention

This invention relates to games of chance, more specifically, to methods of playing a betting game determined by one or multiple rounds of random numbers. It uses computer data possessing for convenience sake, but basically not necessarily computerized.

2. Prior Art

As far as playing surface is concerned every game with a plurality of moving pieces is prior art. As far as betting is concerned, any non-pari-mutuel game of chance, such as craps, keno or roulette is prior art. As far as technology is concerned, games using bet slips and computer data processing such as today's racetrack operation or those listed in the Information Disclosure Statement are all in a sense prior art.

OBJECTS AND ADVANTAGES

At the time of U.S. Pat. No. 5,795,226 being granted, I realized that the non-automatic version requires a 8' by 8' table, a rolling dice box, and so on, all made-to-order only. Its operation requires several workers. All this means high cost, which will result in high house edge, something I hate. Why not replace the big table by a monitor display? Why not let a keno bowl of balls to generate random numbers? Why not allow players to determine own track length, and start a race anytime? etc., various ideas of improvement. Besides, why not change the racing characteristic to movement from one site to another? Why not, instead of racers finishing order, bet that Ann will make a trip from London to Paris followed by Bob from Beijing to Tokyo and then to Sydney. So this invention originated, first disclosed in Ser. No. 11/299,050, then amended in Ser. Nos. 12/589,989 and 13/815,185, and now described here in further easy to understand detail. This invention provides a keno-like game overcoming the following weaknesses of today's keno: 1. Too low winning probabilities and no low house edges. The highest keno winning probability is 1 in 4 while house edge is at least 25% (an exception will be given below). Most casino games have higher probabilities such as roulette "black-red". House edge can be less than 1% such as craps "free odds". Looking into statistic on annual casino revenue and state lottery ticket sale, we see that the common gambling intention is inclined by far to catching low house edge and more probable wins rather than becoming a millionaire fast. 2. Too troublesome to place desired amount of bets. There are 3.5 quintillion possible combinations of 20 out of 80. But, say, you want to play all possible 6-spot catch-all combinations with numbers 1, 2, 3 plus any three numbers from 4 to 80, you need to mark at least a few hundred bet slips for your 73150 bets. No keno writer will be ready to help you. Besides, spots of a group of numbers are not adjacent to each other, or there are more than two groups to circle, confusion will likely occur in computerized digital scanning. 3. Every bet is determined by one draw. The only known exception is 'Exacta' occurred at Gold Coast, Las Vegas, which allowed players to mark the same number of spots, from one to ten, in two consecutive games, paying $1 per game plus $0.25 for exacta. For the best payoff is thus to mark one spot in each game which pay $3 for first game, $3 for second game and $4 for exacta, implying house edges to be 25%, 25% and 0% respectively. Unfortunately, due to 0% on 25 cents and 25% on $2, there is no way to take advantage of a hanging ticket by placing make-up bets after the first game. 4. Problematic to generate random numbers. Keno usually uses a bowl of 80 whirling balls to push one at a time by air force into a selection tube until 20 are collected. The problem is, within a short period of action, not every ball can reach an appropriate position to be pushed. Besides, it occurred that a customer remarked to a keno manager at a Las Vegas casino that Number 29 never came up. Indeed, Number 29 was not in the bowl. There will be no such problem if the game requires, say, to pick just one number out of six while the bowl contains 24 balls, four copies of each number.

In early 1930s the Liberty Bell slot machines with 3-reel, 10 symbols per reel were installed in Las Vegas casinos for the purpose of keeping wives and girlfriends entertained while serious gamblers played at gaming tables. They became one-armed-bandits indicating that payoffs were very poor. Then the computer technology turned them into slot/video monsters, and since 1990s the biggest money-makers in casinos. Their common characteristics are:

(A') Every player occupies one individual machine throughout the whole playing period.

(B') Most machines are bulky, mesmerizing with video displays, high-tech sound effects for entertainment purpose only. Each costs thousands of dollars to manufacture and transport.

(C') Physical/simulated wheels/reels.

(D') Hidden virtual wheels/reel to produce outcomes technically known to the operator only.

(E') PAR sheets and RNG software to ensure operator's maximal profit allowed by government gaming regulations.

(F') Regardless of millions of possible outcomes, only limited number available to bet on.

(G') Besides limited number of paylines, there are "multi-line", "bonus-round", "option-buy", "scatter-pay", "progressive" etc., just luring less intelligent people to wager more and hard to get up from the machine with a possibility of money left to be won. But there is no information materials about which, when and how the possibility may occur.

Due to (D') to (G'), they will not be touched by serious or sophisticated players, who have been simply ignored by the gaming industry.

This invention is to disclose a betting movement operation with the following advantages:

(A) No physical movers or playing surfaces or simulated reels/wheels.—thus convenient and low-cost.

(B) Movers and playing surfaces are displayed on monitors and printed on bet slips/tickets—thus convenient and low-cost.

(BB) Anywhere electronically connected to the game control center can allow placing bets by computerized pointer clicking or screen touching—thus convenient and low-cost.

(C) Using simple random draws to determine the movements of all movers on any bet tickets—thus convenient and low-cost.

(D) Neither PAR sheets nor RNG software—thus no unknown bias against players.

(E) No virtual reels/wheels—thus assuring no hidden outcomes.

(F) Players don't need to stay in front of individual machines to watch outcomes—thus convenient and low-cost.

(G) Players can always arbitrarily bet on any amount of billions predictable outcomes with winning probabilities ranging from 99% to a billionth—thus by far more attractive than limited number of paylines.

(GG) Operators can avoid huge payoff by limiting bet amount.

(H) Every outcome with disclosed mathematical probability—thus attractive to serious players.

(I) Players are assured that the game operator's only advantage is house edge.

(J) Based on known probabilities and known house edges, player can figure out playing plans in advance—thus attractive to serious players.

(K) There are multi-draw bets resulting in hanging bets allowing holder to earns non-cashable credit to place free make-up credit bets—thus attractive to serious players.

(KK1) Credit betting allows player to give up a less probable bigger win for a sure smaller win scientifically—thus attractive to reasonable players.

(KK2) Credit betting reduces the operator's risk of a sudden huge payoff.

(L) House edges formulae for all type of bets, with or without credit, based on final total winning probability, to be applied only to payoff—thus attracting players to place multi-draw bets together with make-up bets, using credit or not; consequently, having more fun and losing money less fast, while the cost of computerized handling is immaterial.

(M) Playing surfaces and ruled movements were unknown to the public till Dec. 12, 2005.

(MM) There is no known prior art requiring specific modular arithmetic required and presented here, which may mesmerize curious intelligent people.

(N) Placing a bet may raise the feeling of going on a trip with loved ones.

Here is a very simple example of dealing with hanging bet for a sure win. Say, I purchase a $100 2-Draw ticket on Ann to go to London first and then to Paris, each time one of seven possible destinations. When the first draw indeed moves Ann to London, I receive no payoff but credit $700 for the hanging bet. To take advantage of it, I can use, say, 60% credit to bet $70 on each of six destinations other than Paris. The result will be a payoff of either $40*49*94.13%=$1845.01, in case of Paris, or $70*7*94.13%=$461.25, in any other cases, where house edges are all 5.87% based on probability 1/49. Now, how about 1 don't want to use any credit? Then, in order to be a sure winner, I need $3,600 to place six $600 make-up bets on all destinations other than Paris. The result will be either a payoff of $100*49*94.13%=$4612.51 on my original ticket where house edge is 5.87% based on probability 1/49, or a payoff of $600*7*95.75%=$4025.10 on any one of six make-up bets where house edge is 4.25% based on probability 1/7. Anyway, I can turn the hanging bet into a sure winner.

More numerical examples to see advantages (G) to (L) will be given later on. The following (1) to (3) is a discussion on various nature of possible game outcomes with their probabilities:

(1) Millions possible outcomes are not predictable to players and their probabilities are determined by RNG and/or recorded on PAR sheets. For example, the game disclosed in Riendeau et al (US-2002/0082071 A1) can provide millions of outcomes to be bet on by millions virtue instant tickets 50. However, Riendeau et al does not discloses all possible branches 54, which seem impossible to be disclosed by simple non-RNG formulas. Mysterious 54 makes serious players not in a position to do something like to plan sure winners as given above. Token 59 is obviously not something to substitute credit bets for any serious player.

(2) Millions possible outcomes are completely predictable to players and their probabilities are determined by law of the nature, which are not calculable by means of simple formulas. For example, a 2-draw game of natural numbers as follows: I, the player, select any 4 to 6 digit even numbers L. The operator will randomly draw two 1 to 9 digit even numbers M and N. The bet becomes hanging if the number of prime numbers lying between L and M and that of between L and N are both odd or both even. In that case, I may trade in a certain percentage of the original bet amount to select one or more 4 to 6 digit even numbers L'. The operator will again randomly draw two 1 to 9 digit even numbers M' and N'. The original bet wins if the number of prime numbers lying between L and M' and that of between L and N' are both odd or both even. A credit bet wins if the number of prime numbers lying between L' and M' and that of between L' and N' are both odd or both even. All credit and payoff will be calculated based on probabilities, which, determined by law of the nature, can be listed by means of a computer program. However, there are simply no general probability equations of {L,M,N} similar to those of this invention. The listing of whole set of winning probabilities for all L, M and N needs thousands sheets of paper to print out. Thus, it is too complicated for players to figure out optimal sure winners.

(3) Millions possible outcomes are completely predictable to players and their probabilities are determined by law of the nature, which are calculable by means of simple formulas, such as those in the game disclosed here. It is clear that formulas related to law of the nature are not patentable, but serious players need them at hand to figure out all sure winners conveniently.

The following (I) to (III) is to point out that thing can be in itself necessarily computerized or it uses computer just for convenience sake.

(I) All Play Station games, XBOX games or the Riendeau et al game providing virtue instant tickets 50 are all in themselves necessarily computerized with individual RNG programs. That is, no computer, no such games.

(II) Banking by ATM or internet, or playing horses at racetrack by touch-screen wagering machine uses computer just for convenience sake. Banking and playing horses existed long ahead of today's computers.

(III) The non-automatic game presented here is in itself not necessarily computerized. Each bet slip functions like a traditional keno ticket; that is, no computer necessary. However, for convenience sake, let us immediately take advantage of wagering machines like playing horses, as stated below in 'Description of the non-automatic game'. Besides, the game can also be made necessarily computerized, as stated below in 'Description of the automatic version'.

SUMMARY OF THE INVENTION

The invention provides a game of chance with a map of sites as playing surface. There are movers on the sites. TV/computer monitors will be required to display the playing surface with movers.

The invention provides a plurality of ruled movements directing movers to move from one site to another. Drawing devices functioning like keno bowls will be required to draw ruled movements at random. Here we need one bowl for each mover, in which there are equally many, say, four balls for each ruled movement.

To run the game non-automatically, it requires an operator to schedule and execute random drawing of ruled movements, one round after another, to move movers accordingly. Every round of drawing will be called a 'draw'.

The invention provides a plurality of paper bet slips showing either the playing surface of all sites for all movers or one regional playing surface of sites for each mover, which can be reached by one draw.

On a bet slip, the bettor marks to select one or more movers on one or more sites expecting to match the outcomes of upcoming one or several draws.

The game requires wagering machines, similar to those used at racetracks, connected to a data processing computer. They examine marked bet slips and print bet tickets showing officially accepted bets, The computer records and processes betting data with drawing results. Like at racetrack, wagering machines can handle cash and credit vouchers. They may also allow bettors to place bets without inserting paper bet slips.

There are 1-Draw or multi-Draw bets. A multi-Draw bet becomes or remains 'hanging' if it contains a selection matching the last draw outcomes, and thus has a chance to be a winner later on. The invention provides the option that a hanging bet holder earns non-cashable credit, which can be used like cash or cashable credit to place bets.

The invention provides formulae to calculate winning and hanging probabilities of every bet as well as payoffs and non-cashable credits.

The invention provides particular house edge formulae to be applied to payoffs.

To run the game automatically, each player needs an individual video/computer devise to conduct draws and to place bets all by oneself. Here, the drawing device will be a TIMER-function random number generator.

DRAWINGS

In the figures, like reference numerals will refer to like elements throughout. For example, numeral 12 will be applied to any mover in any site, regardless whether the mover is an 'actual' one displayed on a monitor, or 'selectable' one on a bet slip or bet ticket. But there are different numerals for sites according to Draw #.

Figure 1:
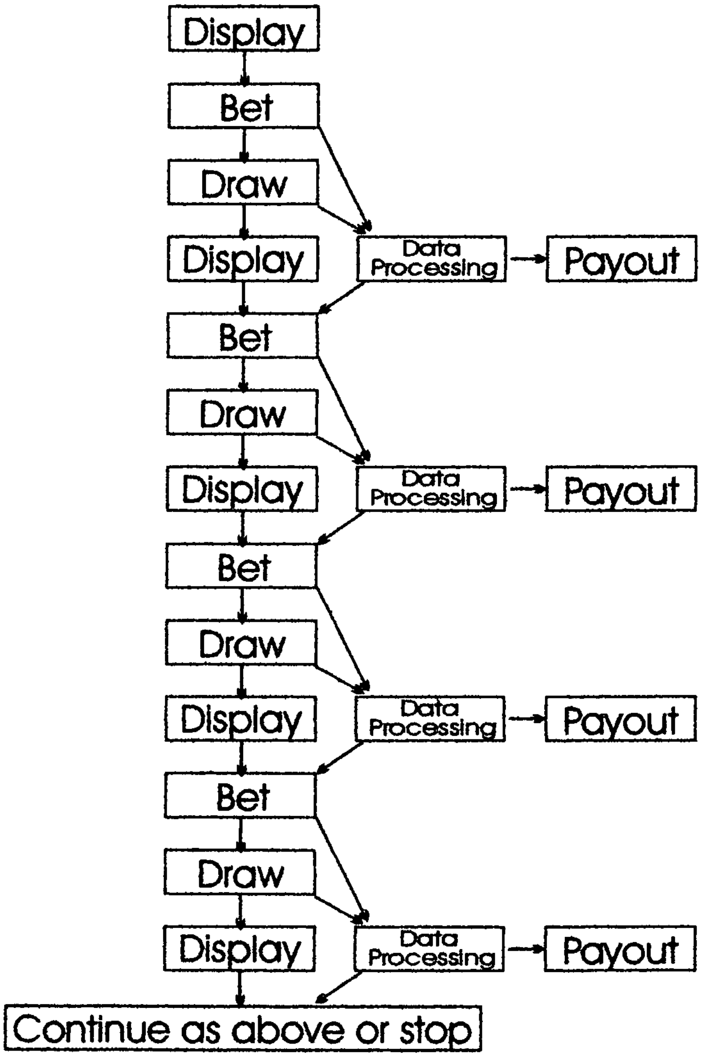
FIG. 1 is a flowchart illustrating the process of gaming operation.

The omission stated above should be easily understandable to everyone. It is not only for aesthetic sake, but also necessary wherever hardly possible to design an acceptable drawing of numerous identical reference numerals with their lead lines. Thus, this kind of omission of identical reference numerals with their lead lines will occur in most of the following figures. Besides, in the figures there are icons/spots named 'Simple', 'Site', 'Mixed', 'Chain' and 'New slip', all without reference numerals due to no practical necessity.

Besides, there will be no practical need of reference numerals in figures of non-chain-bet ticket, while in chain-bet tickets, reference numerals just provided for placing credit bets.

Besides, in all figures of bet tickets:

Sign "X" indicates a selection made before Draw 1.

Sign "=" indicates a selection made after Draw 1.

A gray site indicates where a mover locates before a Draw.

A gray mover indicates where it locates after a Draw.

Figure 2X:
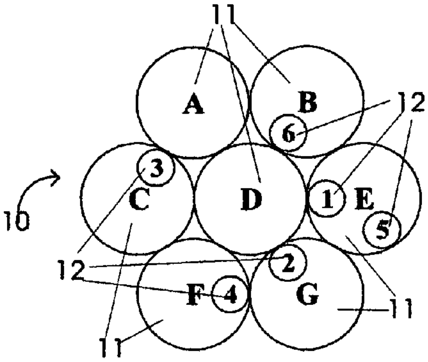
FIG. 2X illustrates a playing surface containing seven sites 11 and six movers 12 together with all reference numerals and lead lines. So many numerals and lead lines make it hardly acceptable.
Figure 2:
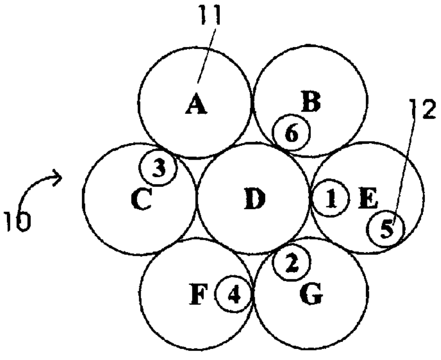
FIG. 2 illustrates a playing surface identical to that of FIG. 2X. However, all but one reference numeral 11 and its lead line will be omitted, and all but one reference numeral 12 and its lead line will be omitted.
Figure 3:
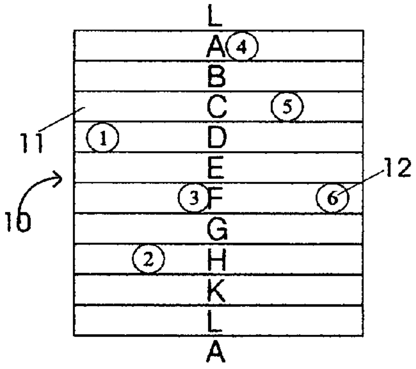
Figure 3:
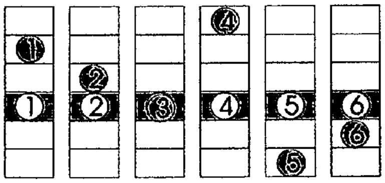

FIG. 3 illustrates a playing surface containing ten sites and six movers. Just as in FIG. 2, all but one reference numeral 11 with lead line and one numeral 12 with lead line will be omitted.

FIG. 3' illustrates a display to show movers locating in gray sites before Draw and becoming gray after Draw. It is a detailed record with no need of reference numerals for further explanation or reference.

Figure 4:
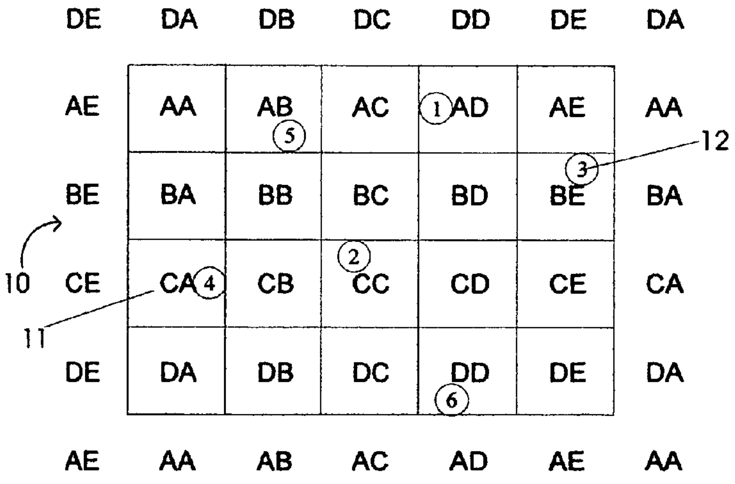
Figure 4:
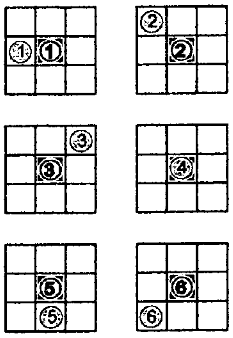

FIG. 4 illustrates a playing surface containing twenty sites and six movers. All but one reference numeral 11 with lead line and one numeral 12 with lead line will be omitted.

FIG. 4' illustrates a display to show movers locating in gray sites before Draw and becoming gray after Draw. It is a detailed record with no need of reference numerals for further explanation or reference.

Figure 2A:
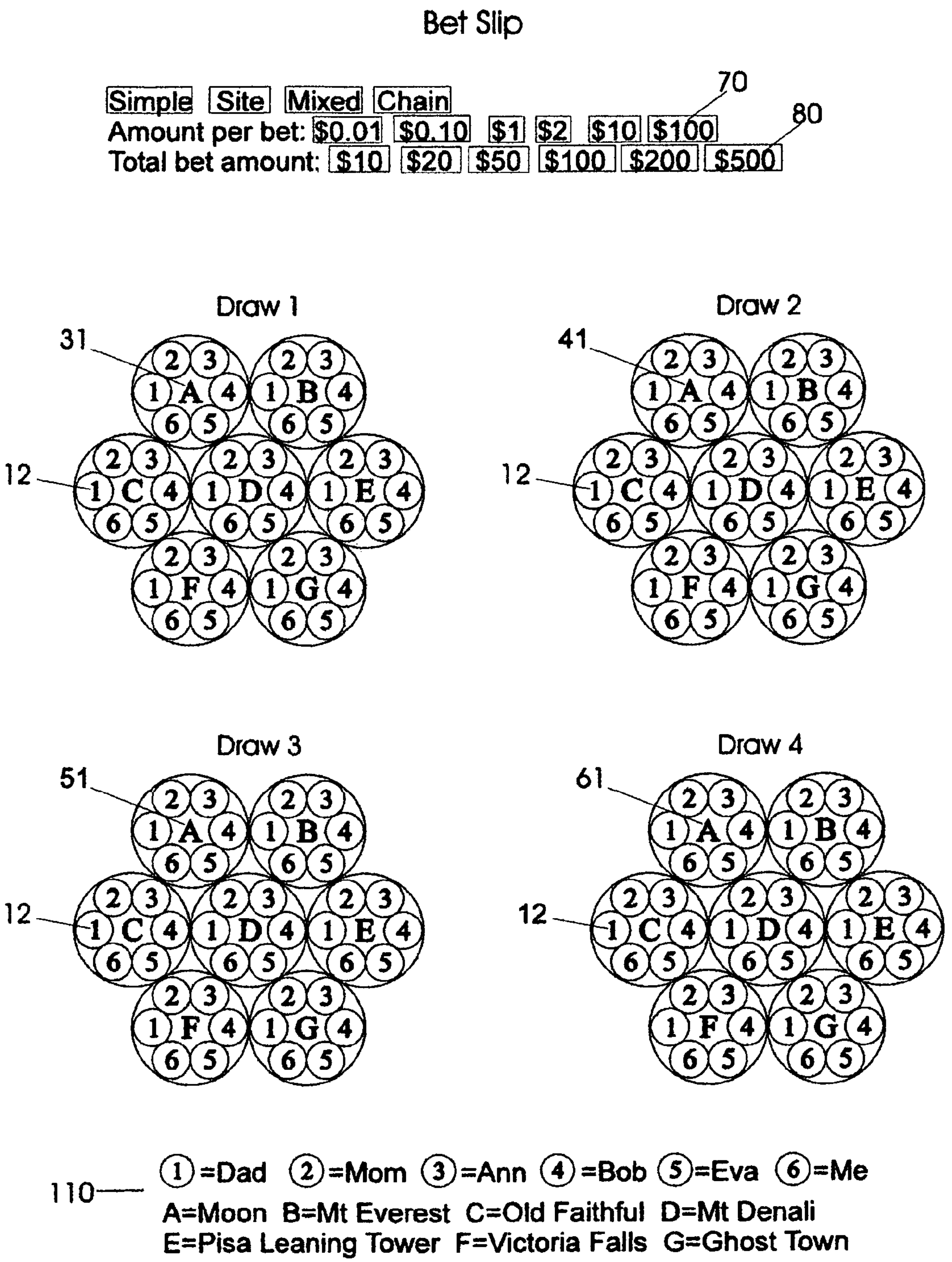

FIG. 2A is a blank bet slip using playing surface as shown in FIG. 2. Without omission there will be six selectable movers 12 in each of seven sites 31, seven sites 41, seven sites 51, and seven sites 61. All but one reference numeral 31, one 41, one 51, one 61 with lead line will be omitted, and all but one reference numeral 12 with lead line related to each of those sites will be omitted. Without omission there will be six selectable amounts per bet 70. All but one numeral 70 with lead line will be omitted. Without omission there will be six total bet amounts 80. All but one numeral 80 with lead line will be omitted.

Figure 2B:
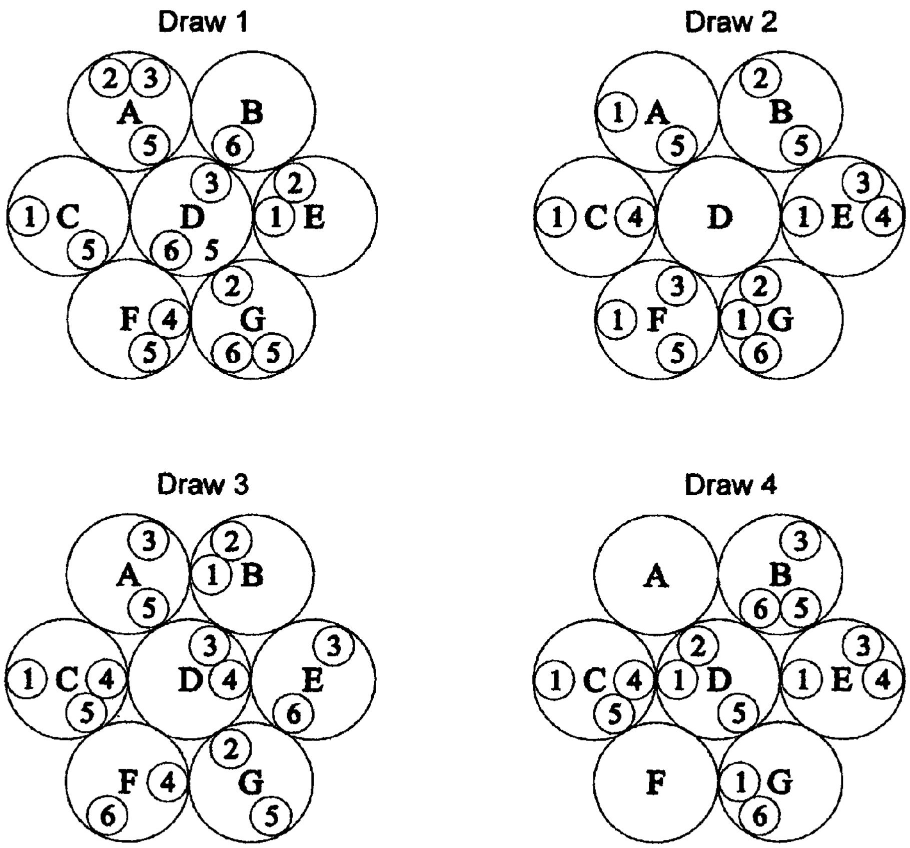
Figure 3A:
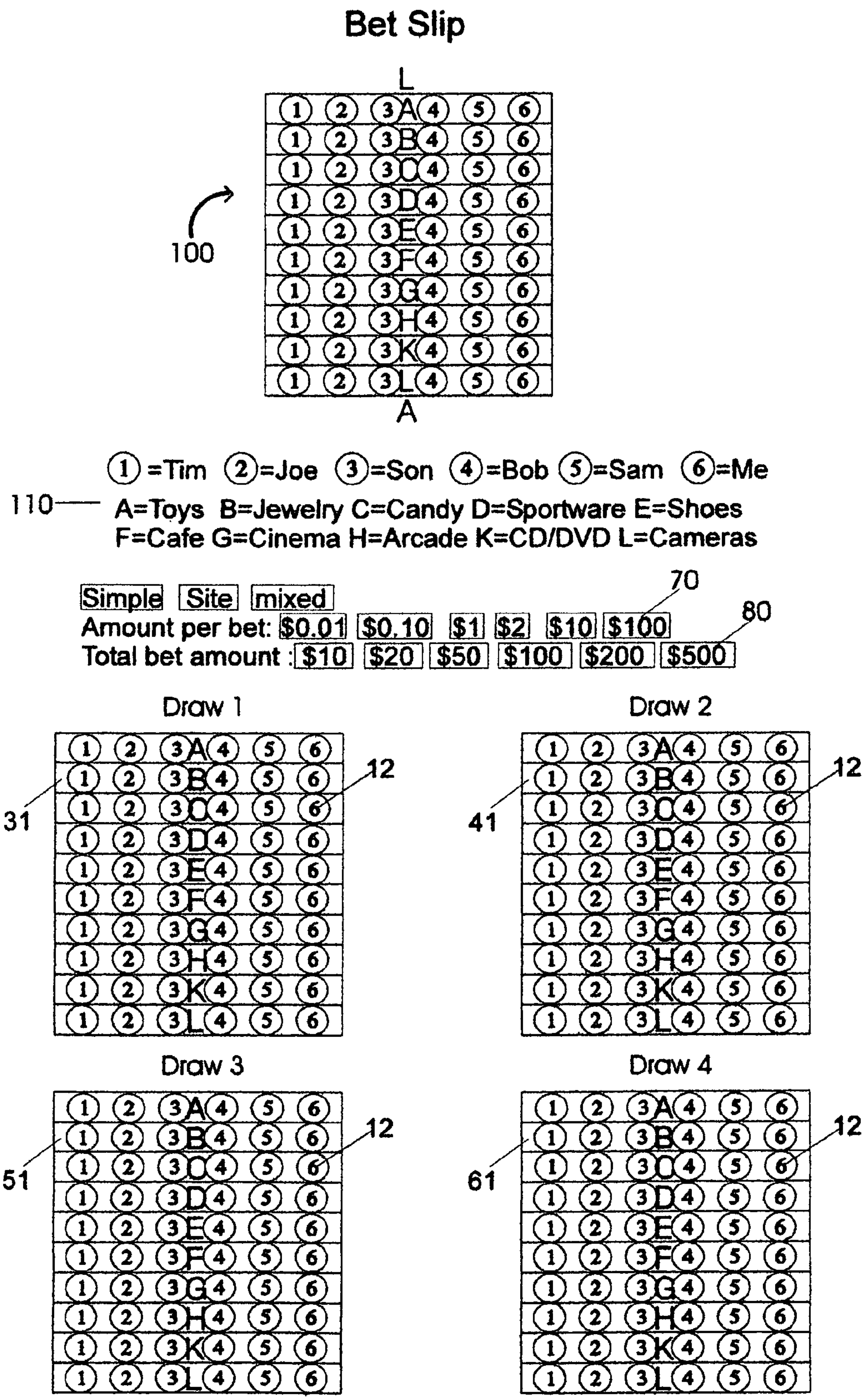
Figure 3B:
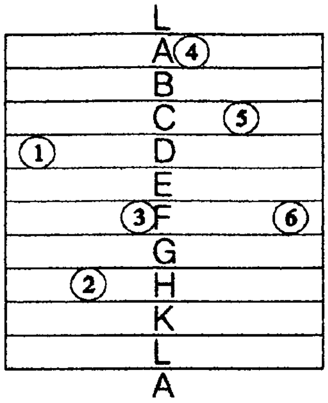
Figure 3B:
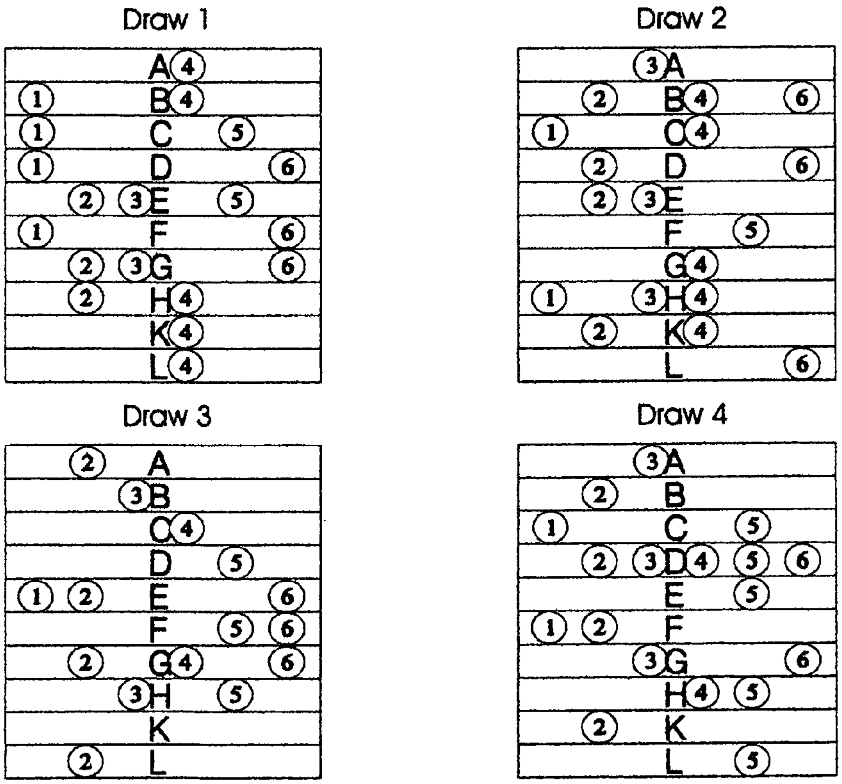
Figure 4A:
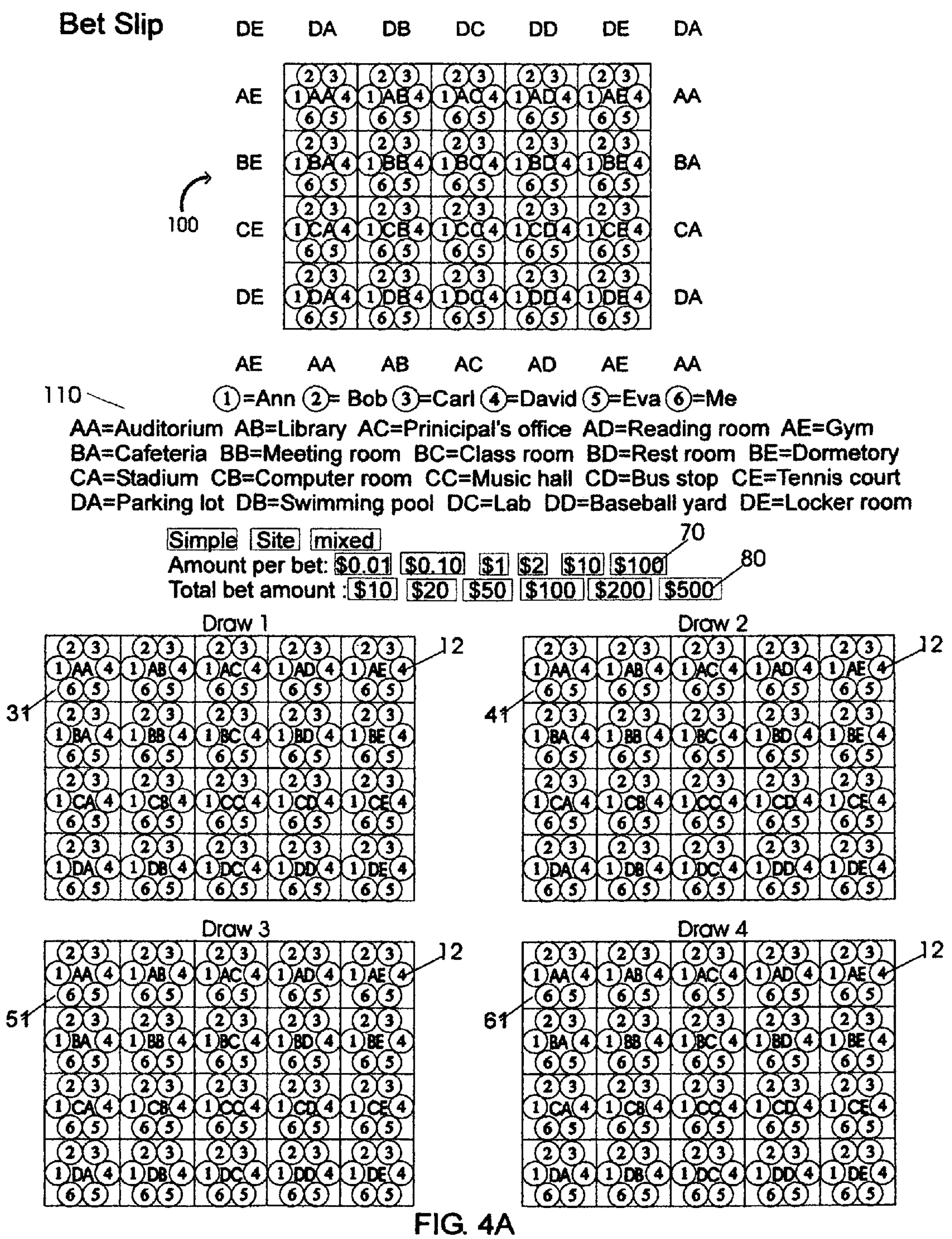
Figure 4A:
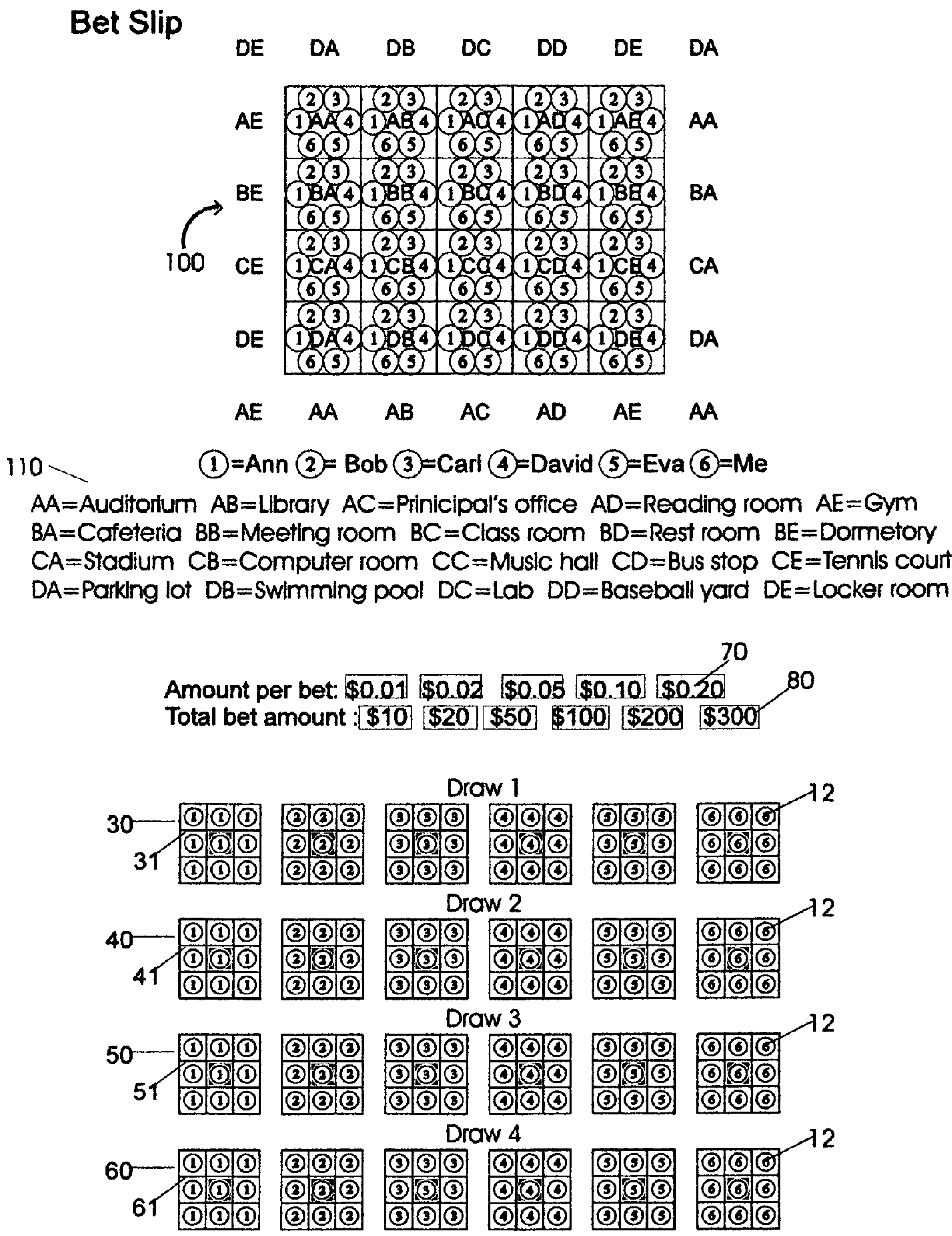

FIGS. 2B, 3B and 4B are each a 'simple' bet ticket showing all bet-on movers in selected sites and wagering amounts based on selections marked on a blank bet slip as shown in FIGS. 2A, 3A and 4A respectively. Each of them is a detailed record with no need of reference numerals for further explanation or reference.

Figure 2C:
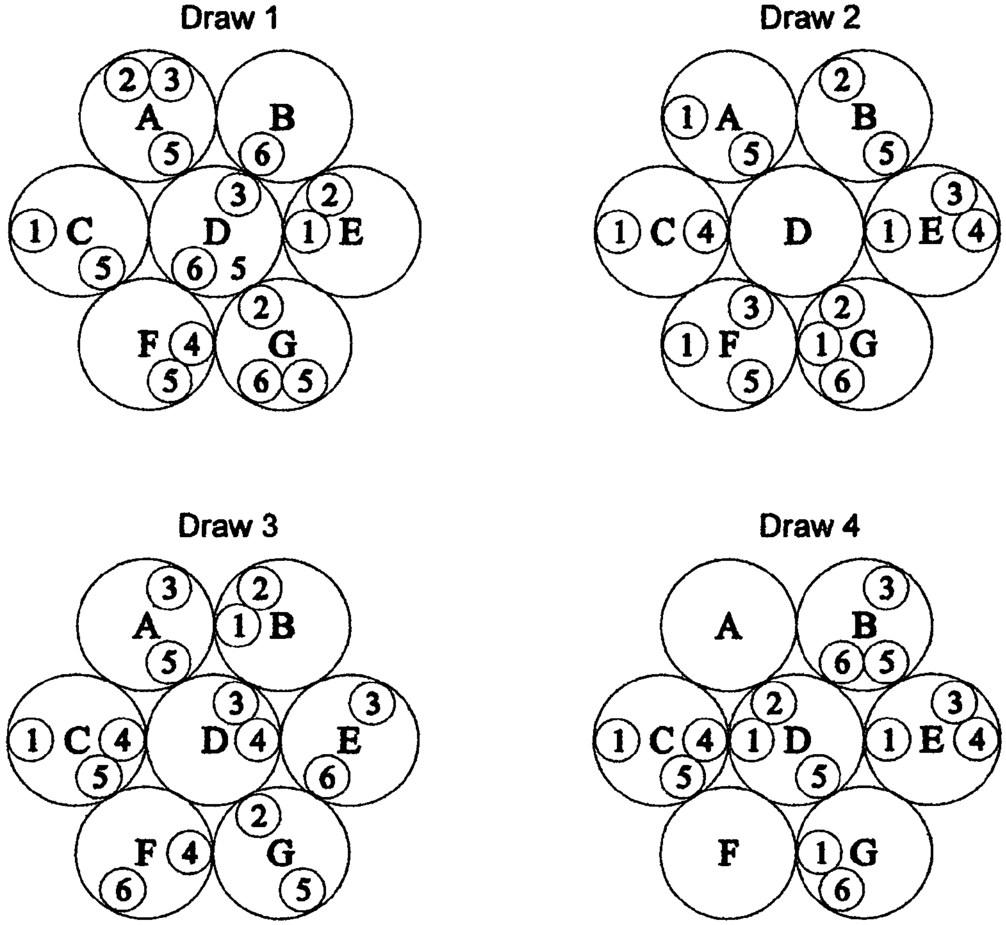
Figure 3C:
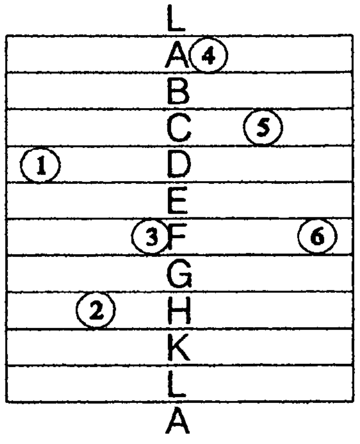
Figure 3C:
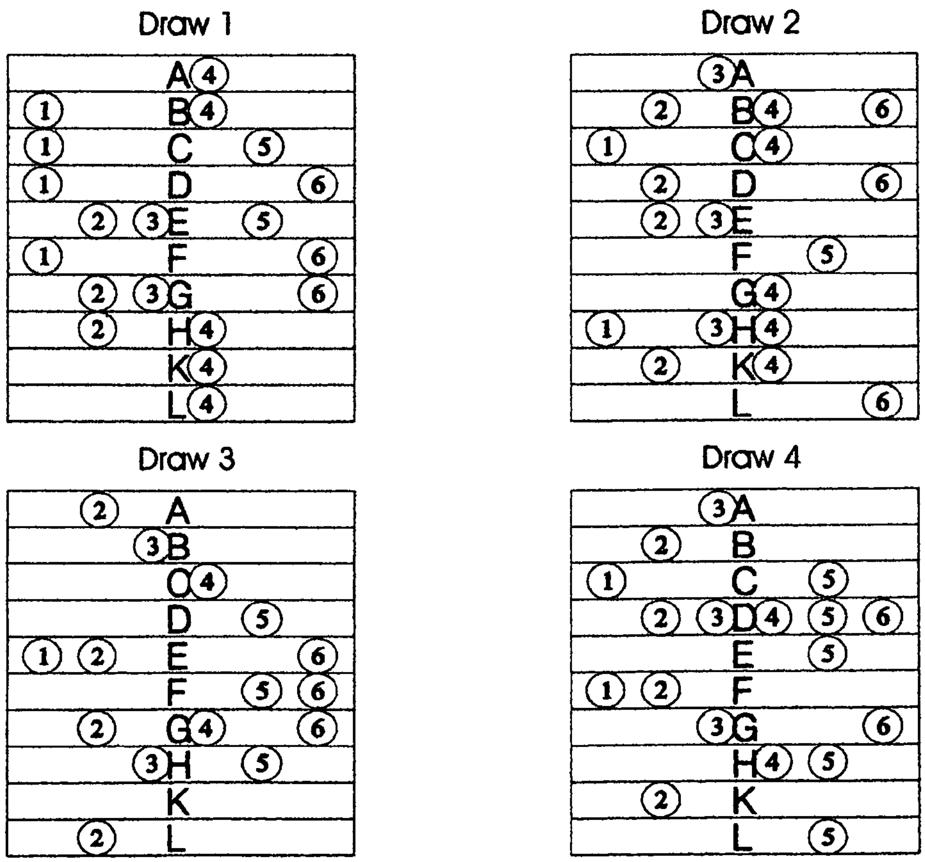

FIGS. 2C, 3C and 4C are each a 'site' bet ticket showing all bet-on movers in selected sites and wagering amounts based on selections marked on a blank bet slip as shown in FIGS. 2A, 3A and 4A respectively. Each of them is a detailed record with no need of reference numerals for further explanation or reference.

Figure 2D:
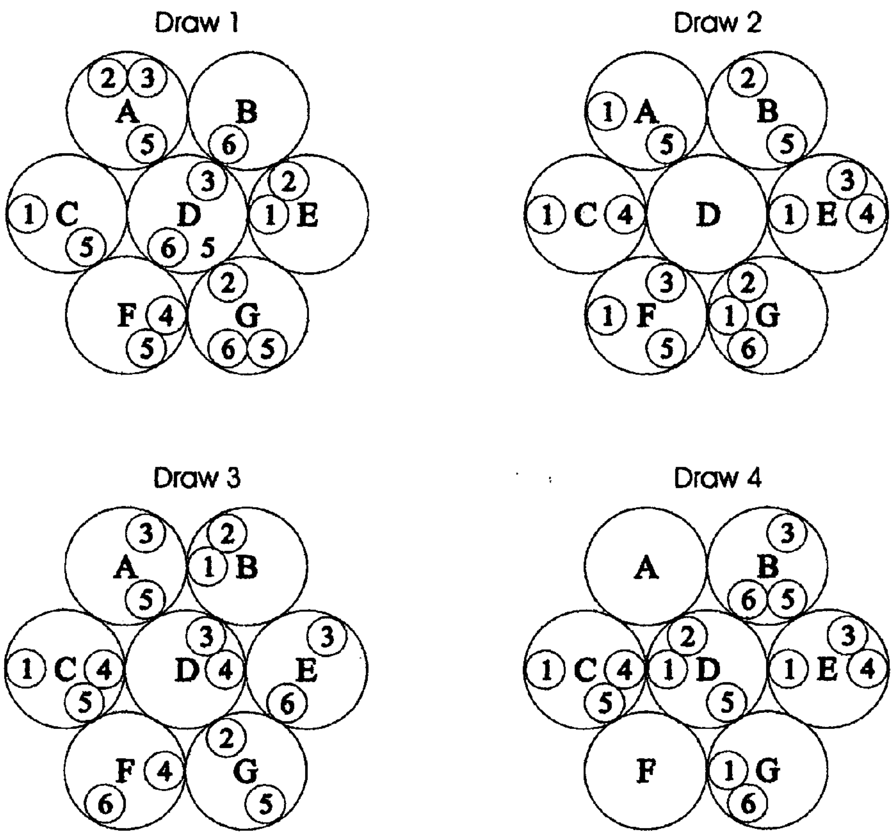
Figure 3D:
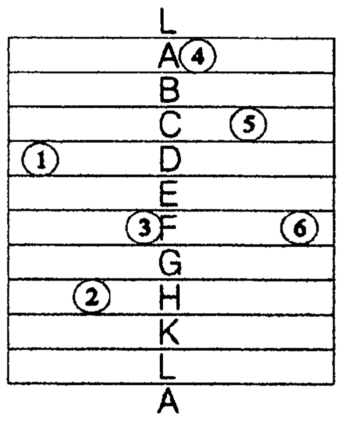
Figure 3D:
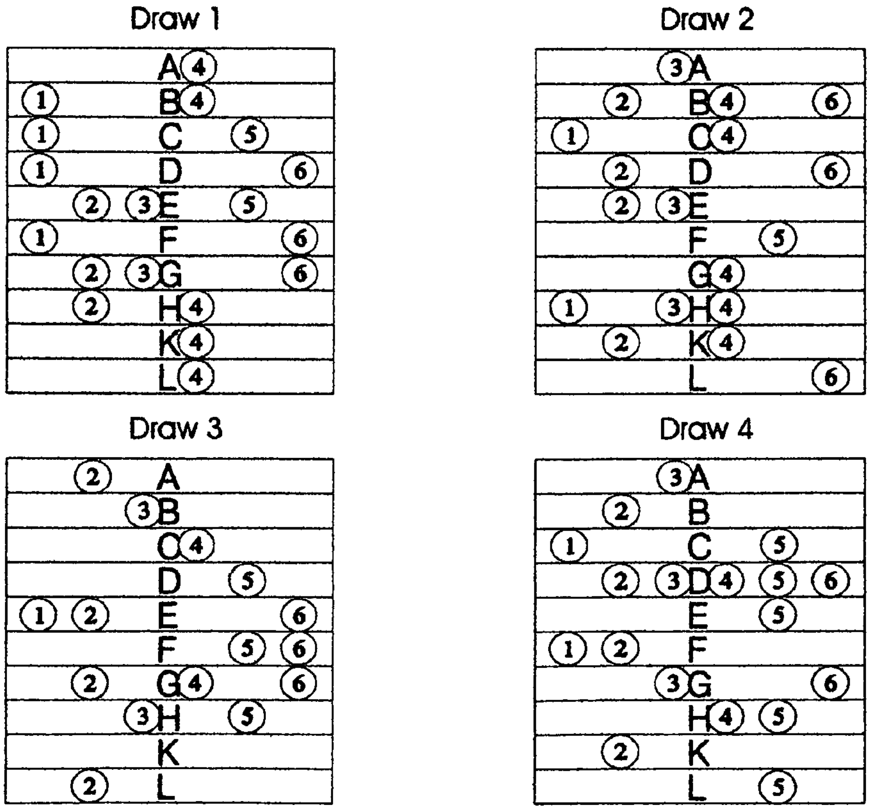
Figure 3A:
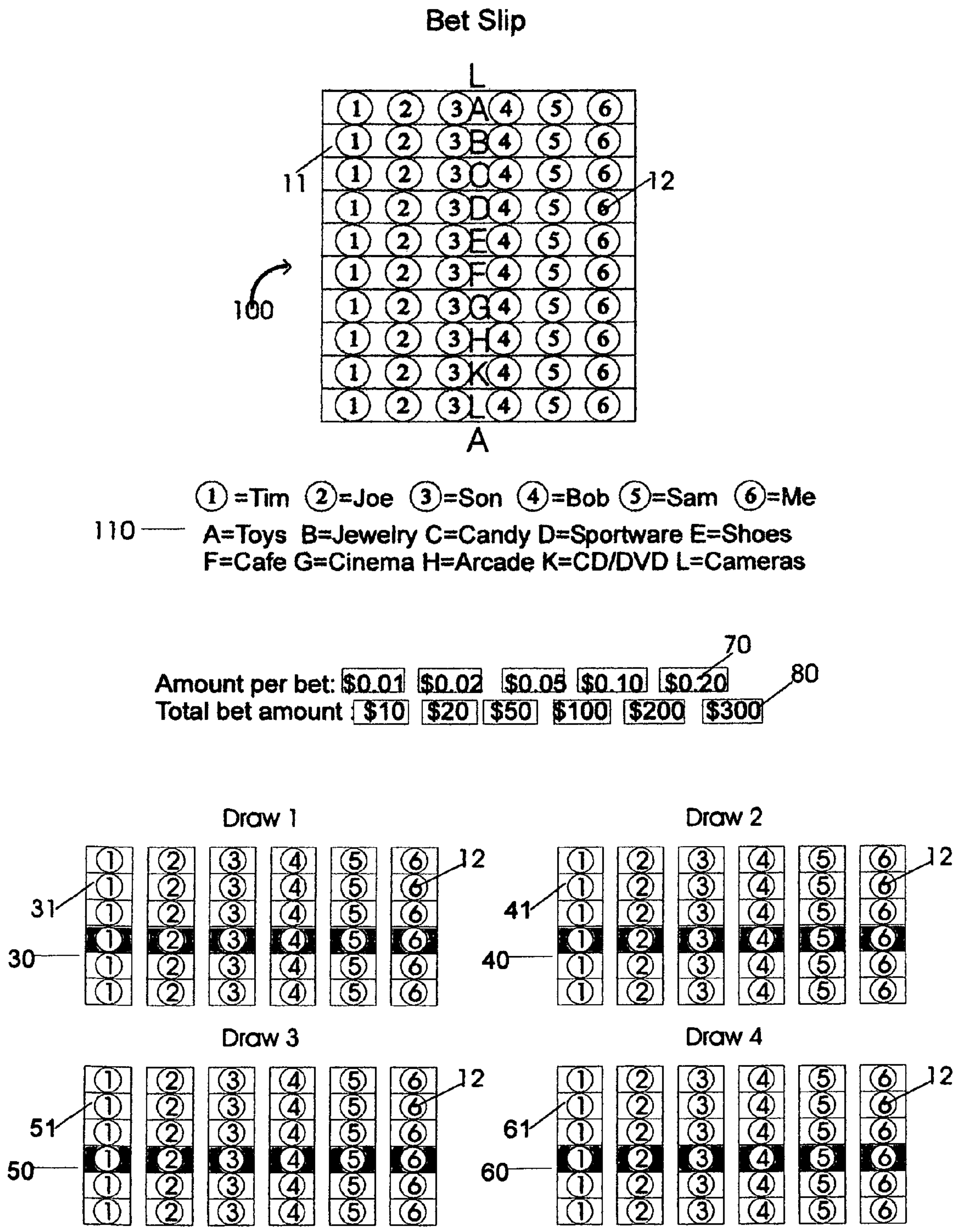

FIGS. 2D, 3D and 4D are each a 'mixed' bet ticket showing all bet-on movers in selected sites and wagering amounts based on selections marked on a blank bet slip as shown in FIGS. 2A, 3A and 4A respectively. Each of them is a detailed record with no need of reference numerals for further explanation or reference.

Figure 2E:
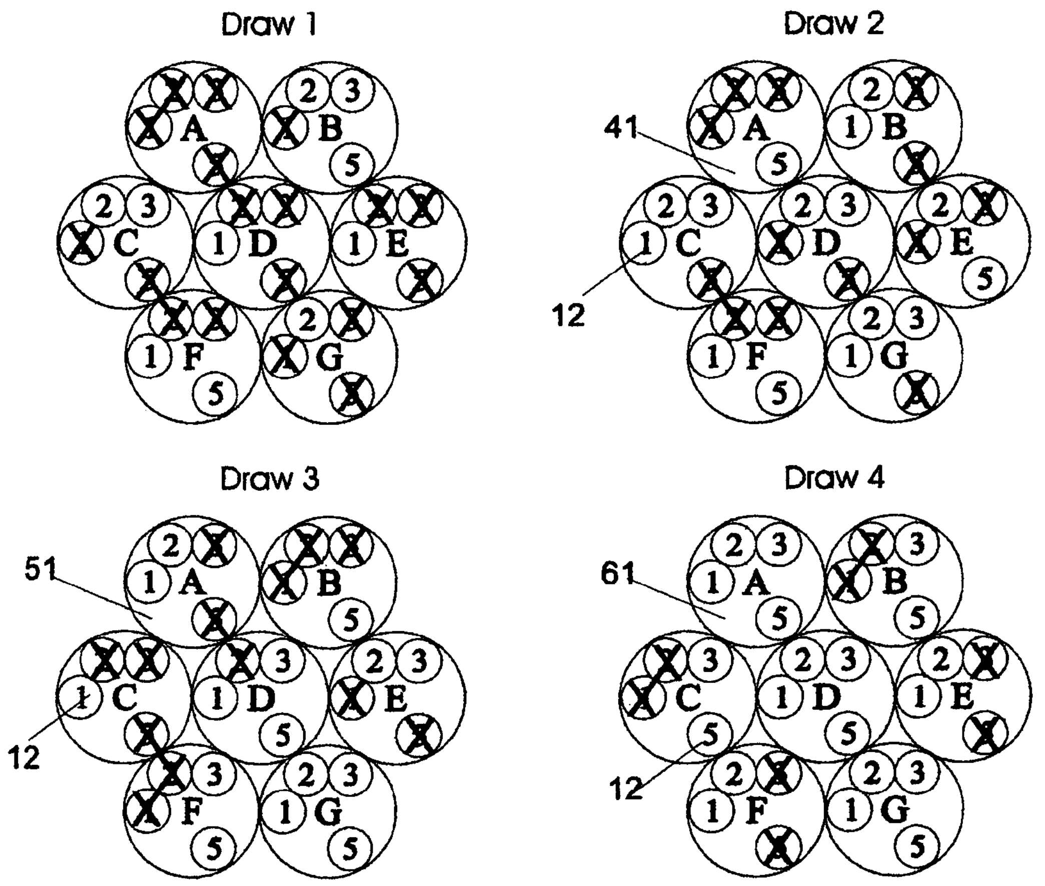

FIG. 2E is a 4-Draw 'chain' bet ticket showing all betting data based on selections marked on a blank bet slip as shown in FIG. 2A. It shows all bet-on movers marked with "X" in selected sites. It is also a slip for credit bets. There are selectable unmarked movers 12 in some of seven sites 41, seven sites 51, and seven sites 61. All but one reference numeral 41, one 51, one 61 with lead line will be omitted, and all but one reference numeral 12 related to each of those sites with lead line will be omitted. Without omission there will be twenty-seven selectable credit percentages 99. All but one of them with lead line will be omitted.

Figure 2F:
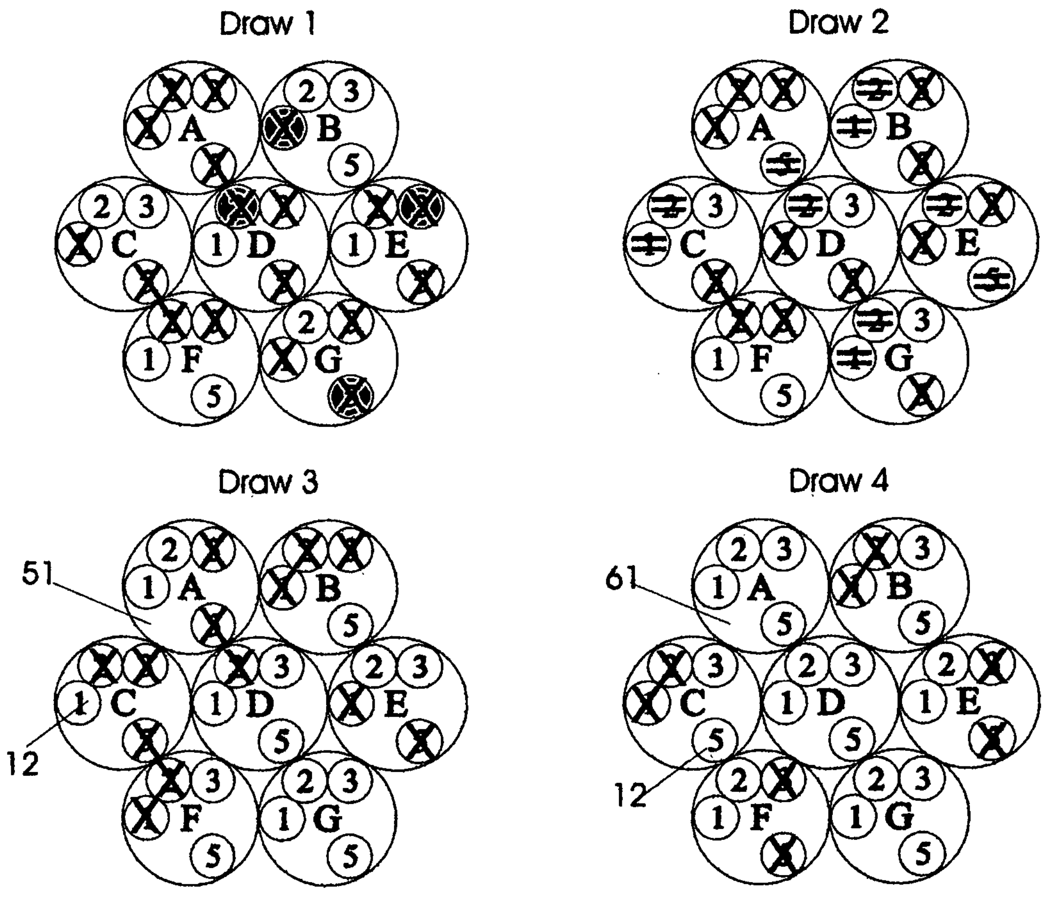

FIG. 2F is the bet ticket as shown in FIG. 2E becoming hanging and being revised. It shows selected credit percentage and Draw 2 credit bet selections marked by "=". It also shows Draw 1 outcomes by gray movers. Since it can be used as slip for further credit bets, there are selectable unmarked movers 12 in sites 51 and sites 61. All but one reference numeral 51 and one 61 with lead lines will be omitted, and all but one reference numeral 12 related to each of those sites with lead line will be omitted. Without omission there will be eighteen selectable credit percentages 99. All but one of them with lead line will be omitted.

Figure 2G:
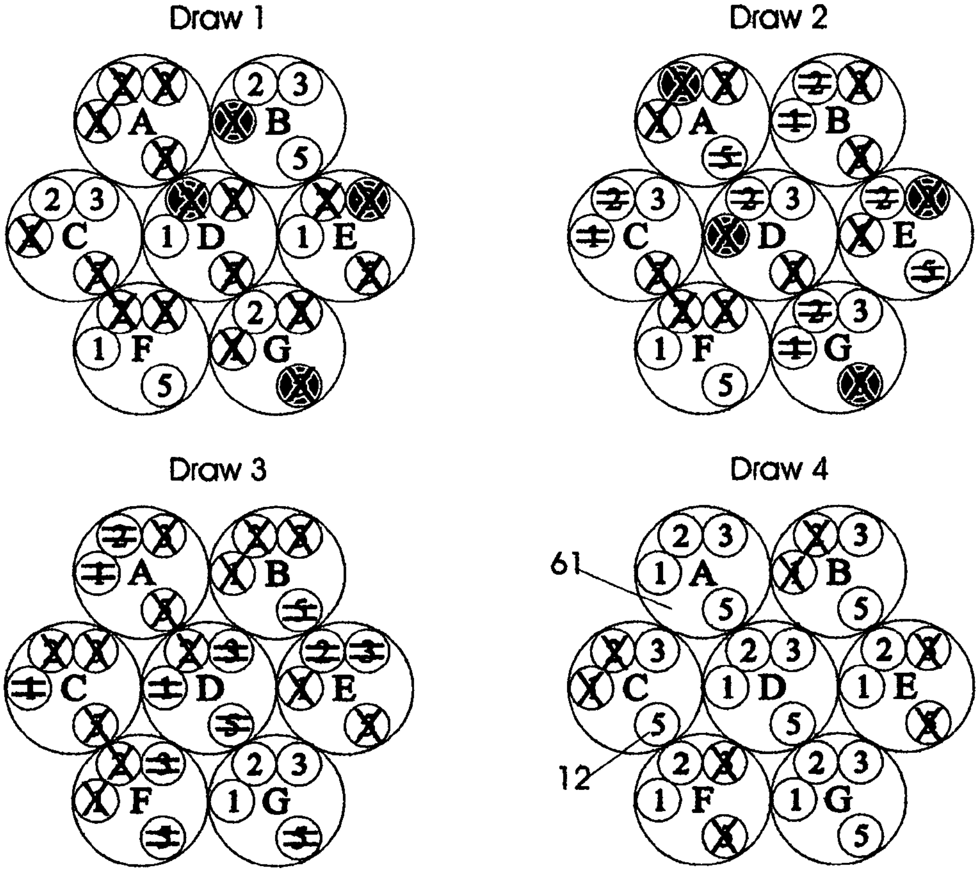

FIG. 2G is the bet ticket as shown in FIG. 2F remaining hanging and being revised. It shows selected credit percentage and Draw 3 credit bet selections marked by "=". It also shows Draw 2 outcomes by gray movers. Since it can be used as slip for further credit bets, there are selectable unmarked movers 12 in sites 61. All but one reference numeral 61 with lead line and one numeral 12 with lead line will be omitted. Without omission there will be nine selectable credit percentages 99. All but one of them with lead line will be omitted.

Figure 2H:
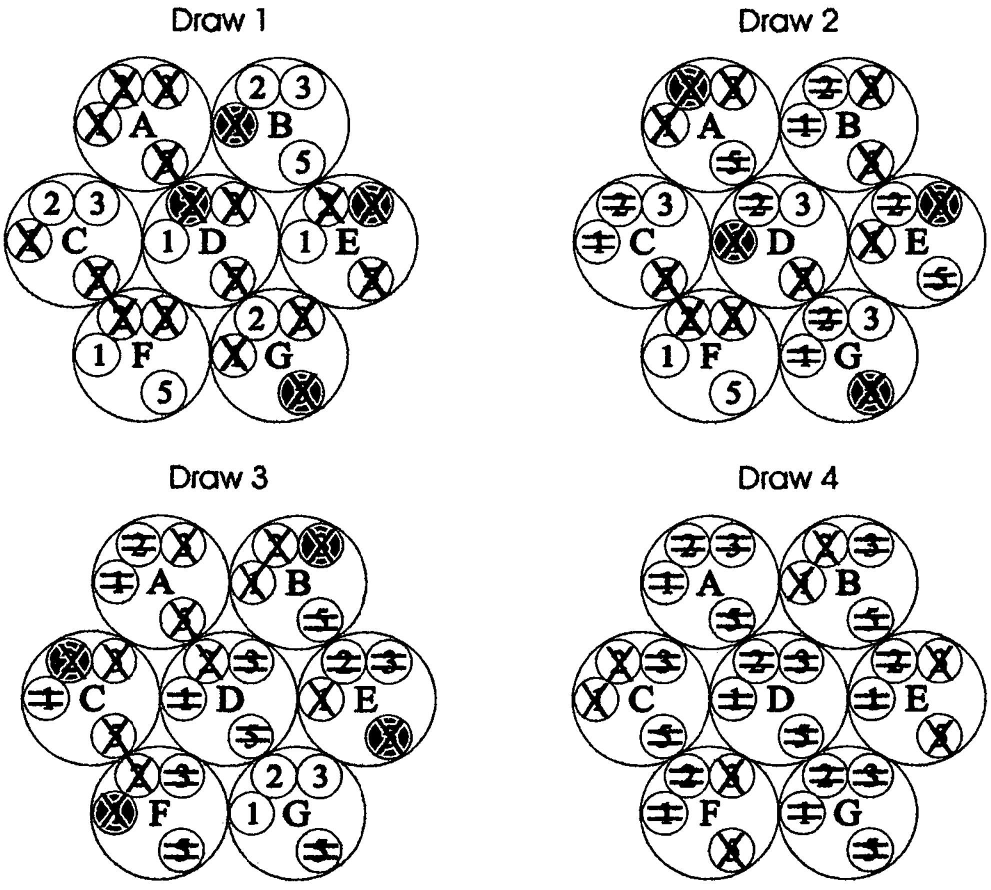

FIG. 2H is the bet ticket as shown in FIG. 2G remaining hanging and being revised. It shows selected credit percentage and Draw 4 credit bet selections marked by "=". It also shows Draw 3 outcomes by gray movers.

FIGS. 3A and 4A are blank bet slips using playing surfaces as shown in FIGS. 3 and 4 respectively. Omissions of reference numbers and lead lines occur similarly to that in FIG. 2A.

Figure 3E:
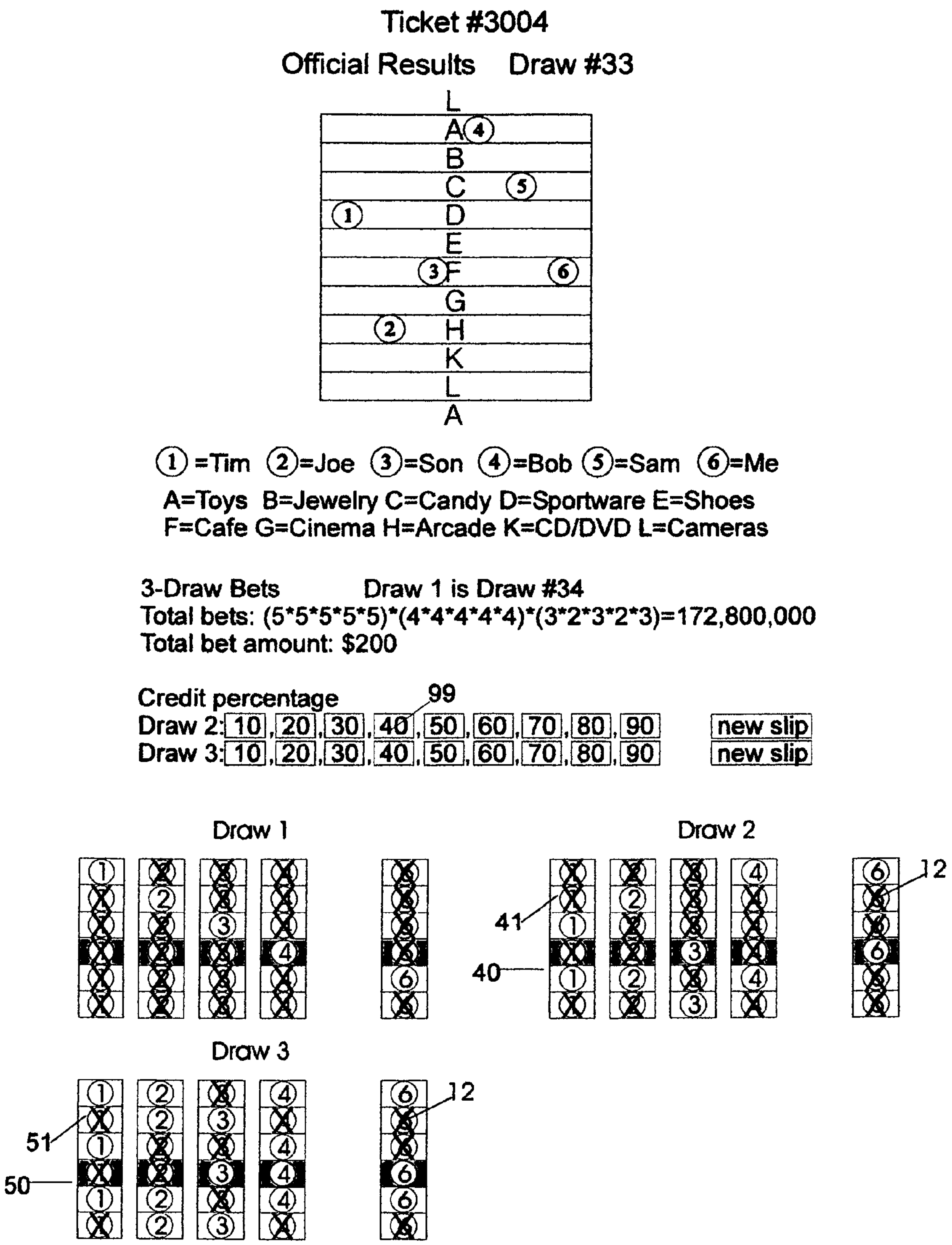

FIG. 3AA is a blank chain bet slips using playing surface as shown in FIG. 3. Without omission there will be six moving regions 30, six 40, six 50 and six 60. All but one numeral 30, one 40, one 50, and one 60 with lead line will be omitted. There are selectable unmarked movers 12 in some of thirty-six sites 31, thirty-six sites 41, thirty-six sites 51, and thirty six sites 61. All but one reference numeral 31, one 41, one 51 and one 61 with lead lines will be omitted, and, related to each of those sites, all but one numeral 12 with lead line will be omitted. Without omission there will be six selectable amounts per bet 70. All but one numeral 70 with lead line will be omitted. Without omission there will be six selectable total bet amounts 80. All but one numeral 80 with lead line will be omitted, FIG. 3E is a 3-Draw bet ticket showing all betting data based on selections marked on a blank bet slip as shown in FIG. 3AA. It shows all bet-on movers marked with "X" in selected sites. It is also a slip for credit bets. There are selectable unmarked movers 12 in some of thirty sites 41, and thirty sites 51. All but one reference numeral 41, one 51 with lead line will be omitted, and, related to each of those sites, all but one reference numeral 12 with lead line will be omitted. Without omission there will be eighteen selectable credit percentages 99. All but one of them with lead line will be omitted.

Figure 3F:
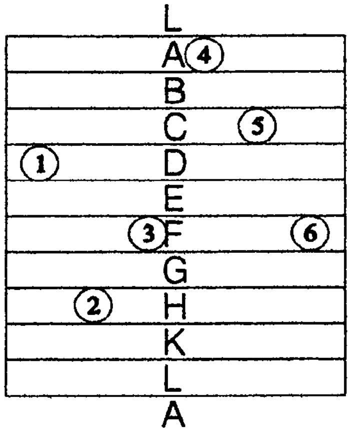
Figure 3F:
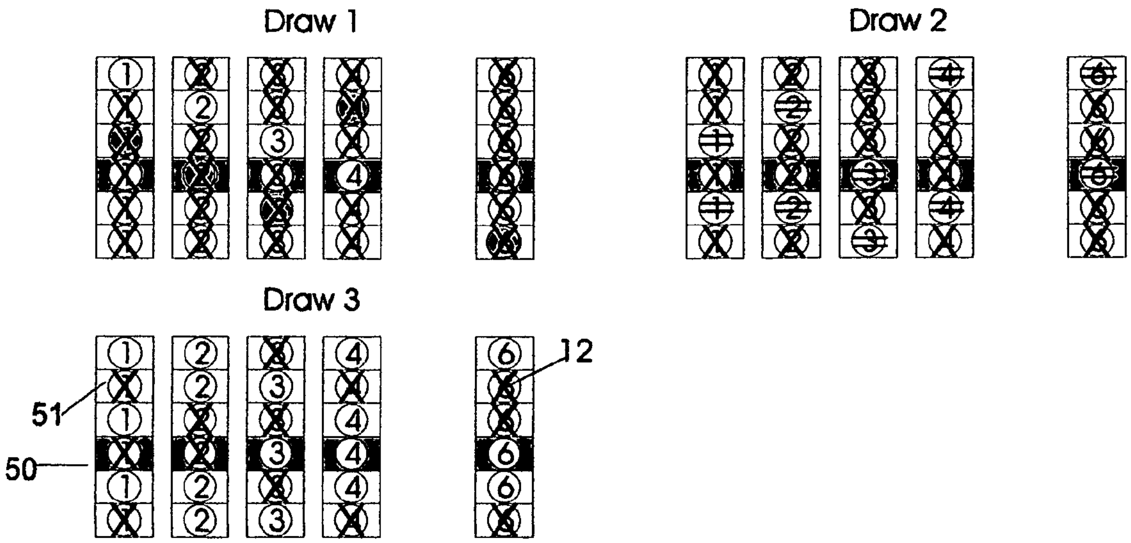

FIG. 3F is the bet ticket as shown in FIG. 3E becoming hanging and being revised. It shows selected credit percentage and Draw 2 credit bet selections marked by "=". It also shows Draw 1 outcomes by gray movers. Since it can be used as slip for further credit bets, there are selectable unmarked movers 12 in sites 51. All but one reference numeral 51 with lead line will be omitted. Without omission there will be nine selectable credit percentage 99. All but one of them with lead line will be omitted.

Figure 3G:
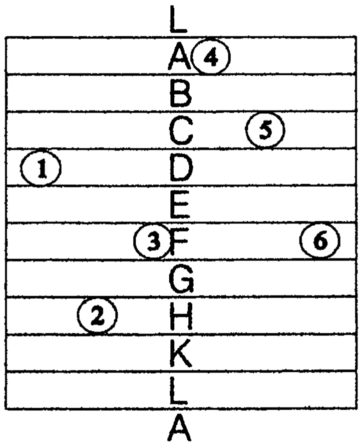
Figure 3G:
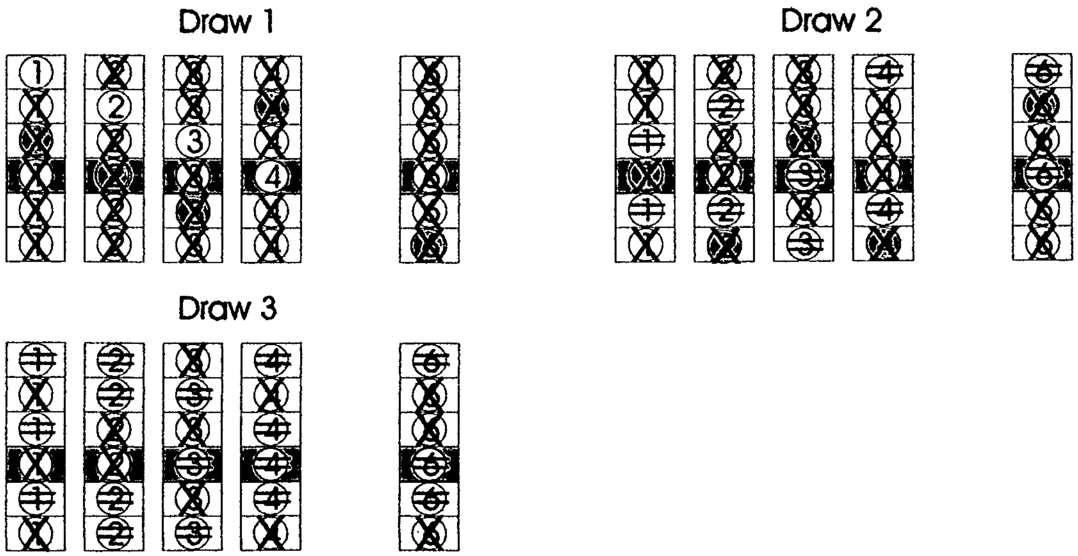

FIG. 3G is the bet ticket as shown in FIG. 3F remaining hanging and being revised. It shows selected credit percentage and Draw 3 credit bet selections marked by "=". It also shows Draw 2 outcomes by gray movers.

FIG. 4AA is a blank chain bet slips using playing surface as shown in FIG. 4. Without omission there will be six moving regions 30, six 40, six 50 and six 60. All but one reference numeral 30, one 40, one 50, and one 60 with lead line will be omitted. There are selectable unmarked movers 12 in some of fifty-four sites 31, fifty-four sites 41, fifty four sites 51, and fifty four sites 61. All but one numeral 31, one 41, one 51 and one 61 with lead lines will be omitted, and, related to each of those sites, all but one reference numeral 12 with lead line will be omitted. Without omission there will be six selectable amounts per bet 70. All but one numeral 70 with lead line will be omitted. Without omission there will be six selectable total bet amounts 80. All but one numeral 80 with lead line will be omitted.

Figure 4E:
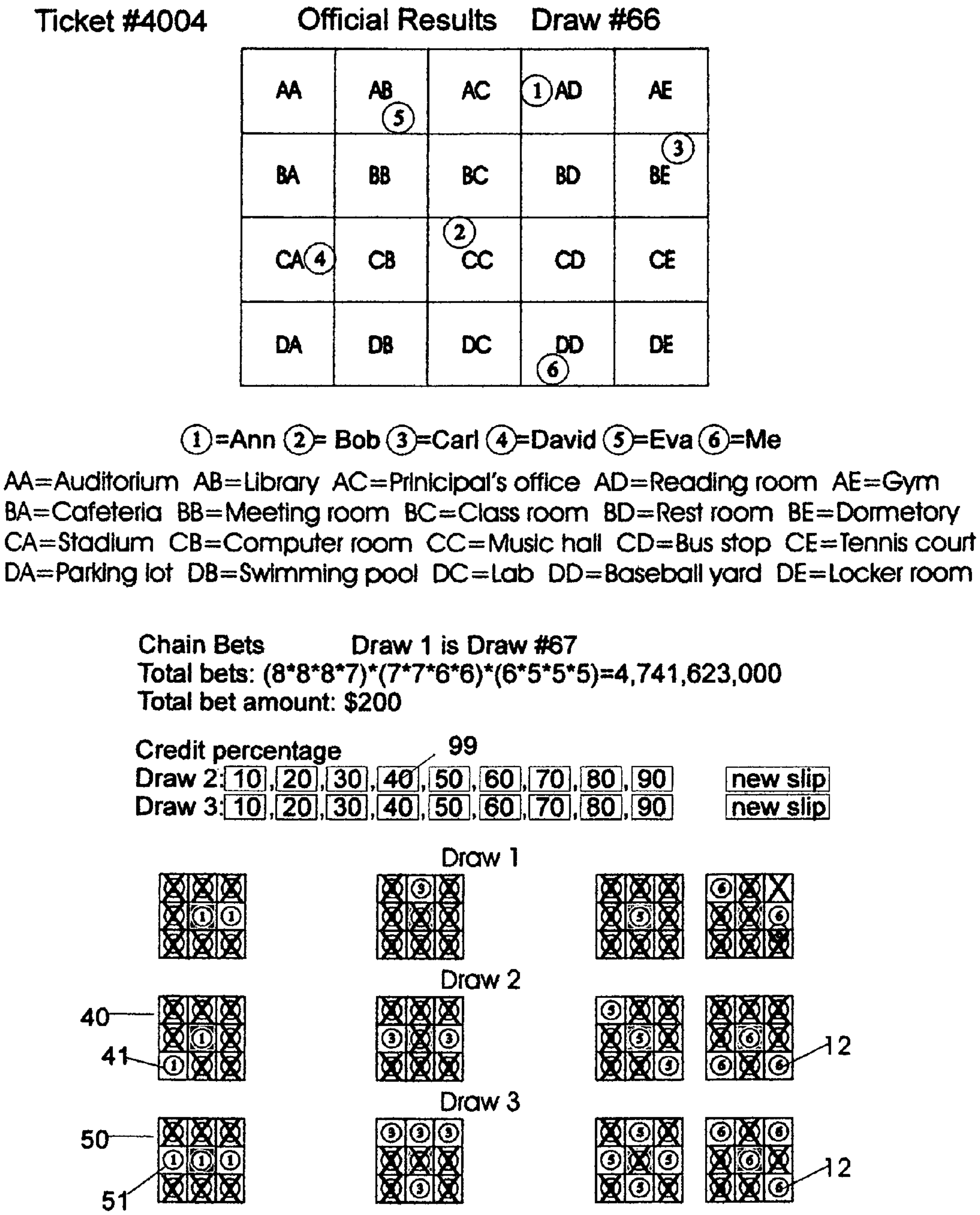

FIG. 4E is a 3-Draw bet ticket showing all betting data based on selections marked on a blank bet slip as shown in FIG. 4AA. It shows all bet-on movers marked with "X". It is also a slip for credit bets. There are selectable unmarked movers 12 in some of thirty-six sites 41 and thirty six sites 51. All but one reference numeral 41, one 51 with lead line will be omitted, and, related to each of those sites, all but one reference numeral 12 with lead line will be omitted. Without omission there will be eighteen selectable credit percentages 99. All but one of them with lead line will be omitted.

FIG. 4F is the bet ticket as shown in FIG. 4E becoming hanging and being revised. It shows selected credit percentage and Draw 2 credit bet selections marked by "=". It also shows Draw 1 outcomes by gray movers. Since it can be used as slip for further credit bets, there are selectable unmarked movers 12 in some of thirty-six sites 51. All but one reference numeral 51 with lead line will be omitted. Without omission there will be nine selectable credit percentage 99. All but one of them with lead line will be omitted.

FIG. 4G is the bet ticket as shown in FIG. 4F remaining hanging and being revised. It shows selected credit percentage and Draw 3 credit bet selections marked by "=". It also shows Draw 2 outcomes by gray movers.

Figures 5, 6:
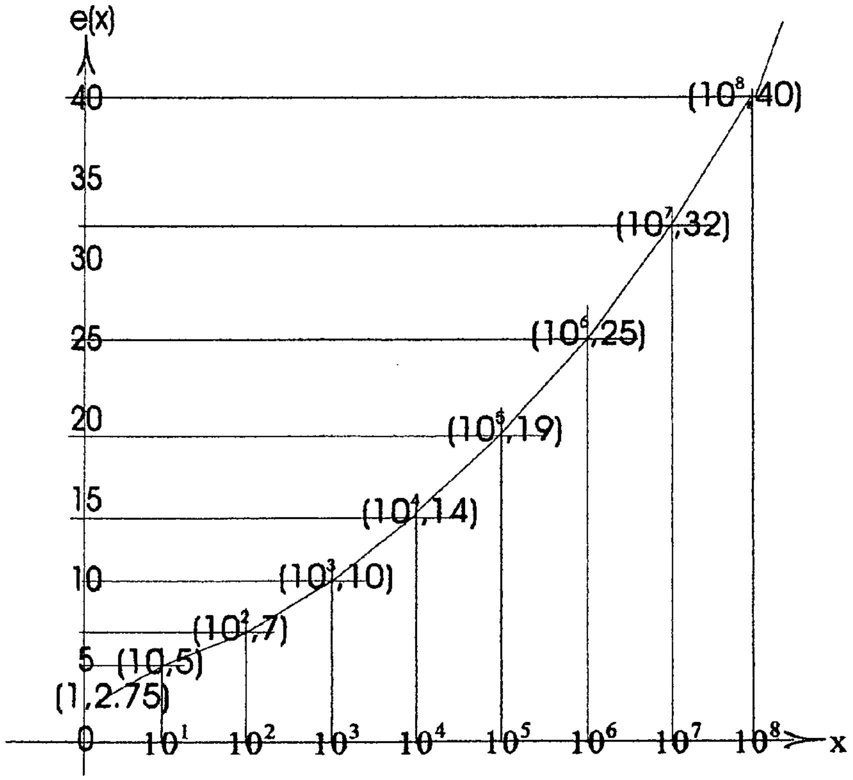

FIG. 5 shows a betting activity statement.

FIG. 6 is a line graph to show house edge formulas based on winning probability.

DESCRIPTION OF VARIOUS PLAYING SURFACES WITH RULED MOVEMENTS

Playing surfaces 10 in FIGS. 2, 3 and 4 will be displayed on a monitor to indicate the locations of movers either set arbitrarily by the game operator before the start of any betting action or determined by the last draw of movements.

A ruled movement aiming at a specific location will be called 'jump'; otherwise, 'non-jump'. All movements on playing surface 10 as shown in FIG. 2 are 'jump', while those on playing surface 10 as shown in FIGS. 3 and 4 are 'non-jump'. As defined below, on any given playing surface, for a mover in any location, there is always the same number w of possible ruled movements.

Playing surface 10 in FIG. 2 contains seven sites 11, on each there are six movers 12.

There are w=7 ruled movements for this playing surface, denoted 'A', 'B", 'C', 'D', 'E', 'F', and 'G', as defined below:

'A' moves the concerning mover to 'A', inclusive from 'A'.
'B' moves the concerning mover to 'B', inclusive from 'B'.
'C' moves the concerning mover to 'C', inclusive from 'C'.
'D' moves the concerning mover to 'D', inclusive from 'D'.
'E' moves the concerning mover to 'E', inclusive from 'E'.
'F' moves the concerning mover to 'F", inclusive from 'F'.
'G' moves the concerning mover to 'G', inclusive from G'.

Playing surface 10 in FIG. 3 contains ten sites 11, on each there are six movers 12. Similarly to most computer/video games, it is necessary to regard the top border line as identical to the bottom line. Due to this identification, the surface is suitable to be painted on a cylinder, and thus henceforth to be referred as 'cylinder'. There are 'A' and 'L' painted outside playing surface 10 shown in FIG. 3 to visualizes this crossing border down/up situation. That is to tell: site 'A' lies one site downward to site 'L', two sites downward to site 'K', site 'B' lies two sites downward to site 'L'; while site 'L' lies one site upward to site 'A', two sites upward to site 'B' and three sites upward to site 'C', site 'K' lies two sites upward to site 'A' and three sites upward to site '13', site 'H' lies three sites upward to site 'A'.

There are w=6 ruled movements for this playing surface, denoted '00', 'U1', 'U2', 'U3', 'D1', and 'D2', as defined below:

'00' keeps the concerning mover unmoved.

'U1' moves the concerning mover one site upward.

'U2' moves the concerning mover two sites upward.

'U3' moves the concerning mover three sites upward.

'D1' moves the concerning mover one site downward.

'D2' moves the concerning mover two sites downward.

Playing surface 10 in FIG. 4 contains twenty sites 11, on each there are six movers 12. Here it is necessary to regard the top border line as identical to the bottom one, the left border line identical to the right one. Due to this identification, the surface is suitable to be painted on a torus, and thus henceforth will be referred to as 'torus'. There are sites 'DE', 'DA' etc. painted outside playing surface 100 to visualizes this crossing border situation. That is to tell: site 'AA' lies surrounded by site 'DA' in the north, by site 'DB' in the northeast, by site 'DE' in the northwest, by site 'AB' in the east, by site 'AE' in the west, by site 'BA' in the south, by site 'BB' in the southeast, and by site 'BE' in the southwest; while site 'AB' lies surrounded by site 'DB' in the north, by site 'DC' in the northeast, by site 'DA' in the northwest, by site 'AC' in the east, by site 'AA' in the west, by site 'BB' in the south, by site 'BC' in the southeast, and by site 'BA' in the southwest; and so on similarly as completely shown in FIG. 4.

There are w=9 ruled movements for this playing surface, denoted '00' 'N', 'W', 'S', 'NE'', 'NW', 'SE', and 'SW', as defined below:

'00' keeps the concerning mover unmoved.

'N' moves the concerning mover to the adjacent site lying north.

'E' moves the concerning mover to the adjacent site lying east.

'W' moves the concerning mover to the adjacent site lying west.

'S' moves the concerning mover to the adjacent site lying south.

'NE' moves the concerning mover to the adjacent site lying northeast.

'NW' moves the concerning mover to the adjacent site lying northwest.

'SE' moves the concerning mover to the adjacent site lying southeast.

'SW' moves the concerning mover to the adjacent site lying southwest.

Description of Placing Bets

There are Draw 1 to Draw 4 1-Draw bets, further classified as 'simple', 'site' or 'mixed'. There are multi-Draw or n-Draw 'chain' bets, where n=2 to 4, further classified as 2-Draw, 3-Draw or 4-Draw. All bets made on one bet slip are of the same class/type. Bet slips can be printed on paper as well as displayed on screen of a wagering machine.

On bet slips as shown in FIGS. 3A, 3AA, 4A and 4AA there is area 100 for bettors, just for reference sake, optionally to mark movers' locations as displayed on the monitor.

On every bet slip there is a naming area 110 just intended to enhance fun unrelated to game rules. Here is nothing for a bettor to mark.

The bet slip as shown in FIG. 2A will be used for any type bet using playing surface as shown in FIG. 2. The bet slip as shown in FIG. 3A will be used for 1-Draw bets using playing surface as shown in FIG. 3, The bet slip as shown in FIG. 3AA will be used for n-Draw bets using playing surface as shown in FIG. 3. The bet slip as shown in FIG. 4A will be used for 1-Draw bets using playing surface as shown in FIG. 4, The bet slip as shown in FIG. 4AA will be used for n-Draw bets using playing surface as shown in FIG. 4. Besides bets using bet slips, 'credit' bets can be placed on a bet ticket as explained later on, A mover once selected in a Draw will be referred to as a 'bet-on' mover of that Draw. A site in which a bet-on mover is located will be referred to as 'selected' site of that mover. Bet-on-mover-site is combining bet-on mover with selected set.

Using bet slip as shown in FIG. 2A, the bettor must mark to select exactly one of 'simple', 'site', 'mixed' or 'chain'. Using bet slip as shown in FIG. 3A or FIG. 4A, the bettor must mark to select exactly one of 'simple', 'site' or 'mixed'.

Regardless of using which bet slip, the bettor must mark to select exclusively either 'amount per bet' 70 or 'total bet amount' 80 for all bets marked on the slip. If you mark more then one per bet amount, such as $1, $2 and $5, then the per bet amount will be their sum, that is $8. If you mark more then one total amount, such as $10 and $20, then the total amount will be their sum, that is $30. All bets on a slip have the same per bet amount.

Referring now to bet slip as shown in FIGS. 2A, 3A and 4A, there are areas Draw 1 to Draw 4 for bettors to mark bet-on movers 12 in sites 31 in Draw 1, in sites 41 in Draw 2, in sites 51 in Draw 3, and in sites 61 in Draw 4 respectively.

When the movement is 'jump', all sites 31 in Draw 1, 41 in Draw 2, 51 in Draw 3 and 61 in Draw 4 as shown in FIG. 2A are reachable by a single movement. When the movement is 'non-jump', referring to FIG. 3A or 4A, not every site 31 in Draw 1 is reachable by a single ruled movement. A mover in an unreachable site will be automatically cancelled by the computer, when the bet slip is submitted for approval. Regardless of 'jump' or 'non-jump', all sites 41, 51 and 61 are all reachable by more than one movement.

Referring now to FIGS. 3AA and 4AA, instead of a complete playing surface for all movers, there are for each mover a moving region 30, 40, 50 and 60. In each of them, the concerning mover is located in the gray site before the concerning Draw. And each of them contains exactly all sites reachable by a single ruled movement of the mover from the gray site. The bettor will mark to bet mover 12 moving to site 31 in Draw 1, to site 41 in Draw 2, to site 51 in Draw 3, to site 61 in Draw 4 respectively. Thus, in multi-Draw, every movement becomes 'jump', namely, from the gray site jumping to any site within the concerning moving region.

In the following, * is the multiplication operator, and ^ the exponent operator. For any f(M), Σ(f(M)) is summation of f(M) over all M to be specified, and Π(f(M)) is multiplication of f(M) over all M to be specified. Mathematically in general, M is a variable of function f, where f remains to be defined. Here, M is the numeral of a numbered mover. We define first f(M) to be #31(M), #41(M), #51(M) and #61(M) respectively as the number of selected sites 31, 41, 51 and 61 of bet-on mover M. We will later on define f(M) to be #d1(i(M)), p1M, pnM, etc.

To place 1-Draw bets, the bettor marks to select one or several movers 12 in sites 31, 41, 51 and 61. Every selected 12 becomes a bet-on mover. The bettor can play any one or more Draws on one bet slip. All Draws are independent. It is allowed, for example, to select some movers in sites 31, some in sites 51, but none in 41 and 61 for playing Draw 1 and Draw 3 only.

In the 'simple' case, every bet-on-mover-site counts a bet, or equivalently, every bet-on mover in each selected site counts a bet; or equivalently, every site with a bet-on mover count a bet. Thus, the numbers of Draw 1, 2, 3, and 4 'simple' bets are Σ(#31(M)), Σ(#41(M)), Σ(#51(M)), and Σ(#61(M)) respectively. For example, in FIG. 2B, Draw 1, there are bet-on mover M=#1 in sites C and E resulting in #31(#1)=2; bet-on mover M=#2 in sites A, E and G resulting in #31(#2)=3; bet-on mover M=#3 in sites A and D, resulting in #31(#3)=2; bet-on mover M=#4 in site F only, resulting in #31(#4)=1; bet-on mover #5 in sites A, C, D, F and G, resulting in #31(#5)-5; and bet-on mover M=#6 in sites B, D and G resulting in #31(#6)=3. Thus, Σ(#31(M))=2+3+2+1+5+3=16. The bettor wins, draw by draw independently, whenever there is one bet-on mover in a selected site 31 matching the outcomes of Draw 1; one bet-on mover in a selected site 41 matching the outcomes of Draw 2. one bet-on mover in a selected site 51 matching the outcomes of Draw 3; one bet-on mover in a selected site 61 matching the outcomes of Draw 4.

In the 'site' case, every selected site with all bet-on movers inside counts a bet. Thus, the numbers of Draw 1, 2, 3, and 4 'site' bets are numbers of selected sites 31, 41, 51, and 61 respectively. The bettor wins, Draw by Draw independently, whenever there is a selected site 31 with all bet-on movers in it matching the outcomes of Draw 1; a selected site 41 with all bet-on in it movers matching the outcomes of Draw 2; a selected site 51 with all bet-on movers in it matching the outcomes of Draw 3; a selected site 61 with all bet-on movers in it matching the outcomes of Draw 4. Note that the outcomes of non-bet-on movers have no effect.

In the 'mixed' case, for any Draw, every distinct combination of each bet-on mover and each selected site counts a bet. Thus, the numbers of Draw 1, 2, 3, and 4 'mixed' bets are Π(#31(M)), Π(#41(m)), Π(#51(M)), and Π(#61(M)) respectively. For example, in FIG. 2D, Draw 1, there are bet-on mover M=#2 in sites A, B, C, D, E and F resulting in #31(#2)=6; bet-on mover in sites B, C, D, F and G resulting in #31(#3)=5; bet-on mover M=4 in sites A, C, D, E and G resulting in #31(#4)=5; bet-on mover M=#5 in sites A, B, D, E, F and G resulting in #31(#5)=6. Thus, there are Π(#31(M))*5*5*6=900 distinct combinations making 900 Draw1 'mixed' bets. For example, in FIG. 2D, Draw 4, there are bet-on mover M=#1 in sites A, C, D, E, F and G resulting in #61(#1)=6; bet-on mover M=#3 in sites B, C, D and F resulting in #61(#3)=4; bet-on mover M=#4 in sites A, B, E and F resulting in #61(#4)=4; bet-on mover M=#6 in sites A, B, D, E, F and G resulting in #61(#6)=6. Thus, there are n (#31(M))=6*4*4*6=576 distinct combinations making 576 Draw 4 'mixed' bets. The bettor wins, draw by draw independently, if there is a combination matching the outcomes. Since only one combination can match the outcomes, for each Draw, the 'mixed' bets on a ticket can bring in one winner only. For example, the bettor wins if the outcomes in FIG. 2D, Draw 1, are #2 in A, #3 on G, #4 in C and #5 in B; or are #2 in D, #3 in C, #4 in D and #5 in A.

To place 2-Draw bets, the bettor marks to select first one or several movers in site 31 for Draw 1 just like making a Draw 1 'mixed' bets, and then one or several movers in sites 41 for Draw 2. Every Draw 1 bet-on mover must be bet-on in Draw 2 and vice versa. In the case of using bet slip as shown in FIG. 3AA or FIG. 4AA, gray site 31 is where a concerning mover is located before Draw 1: gray site 41 is where a concerning mover is located before Draw 2, which is yet unknown. The same numbered bet-on mover in any selected site 41 is valid for all selected sites 31, no matter what the outcomes of Draw 1 may be. If the bettor wants a certain selected site 41 just for a certain selected site 31, then it is necessary to use separate bet slips. For example, using one bet slip you can bet a mover moves first either to east or west and then either to north or south. Here are four bets on one slip. If you want to bet that the mover moves either 'first to east then to north' or 'first to west then to south', i.e., two bets only, then you need to place them separately using two bet slips.

2-Draw bets are to combine Draw 1 'mixed' bets with Draw 2 'mixed' bets. Thus, the numbers of 2-Draw bets is Π(#31(m)*Π(#41(M)). For example, if there are bet-on movers A, B and C with #31(A)=4, #31(B)=3, #31(C)=5, #41(A)=2, #41(B)=6, and #41(C)=1, then the total number of bets is Π(#31(M)*Π(#41(M))=(4*3*5)*(2*6*1)=720. If the ticket contains a combination matching the outcomes of Draw 1, then there will be Π(#41(M)) hanging bets. Then it wins if it contains a combination matching the outcomes of Draw 2. Since only one combination can match the outcomes, every slip can bring in one winner only.

To place 3-Draw bets the bettor marks to select first just as explained in the 2-Draw case; then one or several movers in sites 51 for Draw 3. Every Draw 1 and Draw 2 bet-on mover must be bet-on in Draw 3 and vice versa. In the case of using bet slip as shown in FIG. 3AA or FIG. 4AA, gray site 51 is where a concerning mover is located before Draw 3, which is yet unknown. The same numbered bet-on mover in any selected site 51 is valid for all selected sites 31 and 41, no matter what the outcomes of Draw 1 and Draw 2 may be. If the bettor wants a certain selected site 51 just for a certain selected sites 31 and 41, then it is necessary to use separate bet slips.

3-Draw bets are to combine 2-Draw bets with Draw 3 'mixed' bets. Thus, the numbers of 3-Draw bets is Π(#31(M)*Π(#41(M))*Π(#51(M)). If the ticket contains a combination matching the outcomes of Draw 1, then there will be Π(#41(M))*Π(#51(M)) hanging bets. Next, if it contains a combination matching the outcomes of Draw 2, then there will be Π(#51(M)) bets remaining hanging. Finally it wins if it contains a combination matching the outcomes of Draw 3. Since only one combination can match the outcomes, every slip can bring in one winner only.

To place 4-Draw bets the bettor marks to select first just as explained in the 3-Draw case; then one or several movers in sites 61 for Draw 4. Every Draw 1 to Draw 3 bet-on mover must be bet-on in Draw 4 and vice versa. In the case of using bet slip as shown in FIG. 3AA or FIG. 4AA, gray site 61 is where a concerning mover is located before Draw 4, which is yet unknown. The same numbered bet-on mover in any selected site 61 is valid for all selected sites 31, 41, and 51, no matter what the outcomes of Draw 1 to Draw 3 may be. If the bettor wants a certain selected site 61 just for a certain selected sites 31, 41, and 51, then it is necessary to use separate bet slips.

4-Draw bets are to combine 3-Draw bets with Draw 4 'mixed' bets. Thus, the numbers of 4-Draw bets is Π(#31(M)*Π(#41(M))*Π(#51(M))*Π(#61(M)). If the ticket contains a combination matching the outcomes of Draw 1, then there will be Π(#41(M))*Π(#51(M)*Π(#61(M)) hanging bets. Next, if it contains a combination matching the outcomes of Draw 2, then there will be Π(#51(M))*Π(#61(M)) bets remaining hanging. Again, if it contains a combination matching the outcomes of Draw 3, then there will be Π(#61(M)) bets remaining hanging. Finally it wins if it contains a combination matching the outcomes of Draw 4. Since only one combination can match the outcomes, every slip can bring in one winner only.

Every marked bet slip will be checked and approved by the computer in order to issue a bet ticket as shown in FIGS. 2B, 3B and 4B for 'simple' bets: or FIGS. 2C, 3C and 4C for 'site' bets or FIGS. 2D, 3D and 4D for 'mixed' bets; or FIGS. 2E, 3E and 4E for 'chain' bets. Each bet ticket shows an ticket number, and all data based on marked selections of a bet slip, which includes type of bets, total number of bets, per bet amount or total bet amount, and the concerning Draw # of Draw 1. Besides, except movements being 'jump', the bet ticket prints the playing surface with start locations of all movers before Draw 1, which are either the official results of the draw prior to Draw 1 or set by the operator before the start. In the case of 1-Draw bets, only bet-on movers in selected sites will show up in the bet ticket. In the case of 'chain' bets, all bet-on movers in selected sites will be marked with "X". Data shown in a bet ticket issued before the concerning Draw 1 will be referred to as 'original'. Data occurred after Draw 1 are 'updated'.

After Draw 1, every hanging n-Draw bet earns credit—its amount to be shown later on—. Any ticket containing a hanging bet can be used as bet slip to place credit bets as follows: The bettor marks to select 'credit percentage' 99 and either 'new slip' or not. In case of no new bet slip, each existing bet-on-mover-site in Draw 2 on the bet ticket automatically counts as a Draw 2 'simple' bet, the bettor may mark to select bet-on movers in additional sites 41 to bet on. The total hanging bet credit modified by selected percentage 99, referred to as r2, will be evenly applied to all Σ(#41(M)) Draw 2 'simple' bets. Every original \$a bet will be reduced to a \$a*(100−r2)% bet, The ticket as bet slip will be approved by the computer so that a revised ticket as shown in FIG. 2F, 3F or 4F can be issued. In addition to existing data the revised ticket shows selected credit percentage for Draw 2, and all new bet-on selections marked with "=". Besides, every bet-on mover will show up in gray to indicate its location determined by Draw 1. The bettor with no intention to make credit bets may submit a hanging bet ticket without any credit bet selection to obtain a revised ticket, which just updates Draw 1 results by showing gray movers.

After Draw 2, every remaining hanging n-Draw bet earns credit—its amount to be shown later on—. Any ticket, revised or not, containing a hanging bet can be used as bet slip to place credit bets as follows: The bettor marks to select 'credit percentage' 99 and either 'new slip' or not. In case of no new bet slip, each existing bet-on-mover-site in Draw 3 on the bet ticket automatically counts as a Draw 3 'simple' bet, the bettor may mark to select bet-on movers in additional sites 51 to bet on. The total hanging bet credit modified by selected percentage 99, referred to as r3, will be evenly applied to all Σ(#51(M)) Draw 3 'simple' bets. Every original \$a bet will be reduced to a \$a*(100−r2)%*(100−r3)% bet. The ticket as bet slip will be approved by the computer so that a revised ticket as shown in FIG. 2G, 3G or 4G can be issued. In addition to existing data the revised ticket shows selected credit percentage for Draw 3, and all new bet-on selections marked with "=". Besides, every bet-on mover will show up in gray to indicate its location determined by Draw 2. The bettor with no intention to make credit bets may submit a hanging bet ticket without any credit bet selection to obtain a revised ticket, which just updates Draw 2 outcomes by showing gray movers.

After Draw 3, every remaining hanging n-Draw bet earns credit—its amount to be shown later on—. Any ticket, revised or not, containing a hanging bet can be used as bet slip to place credit bets as follows: The bettor marks to select 'credit percentage' 99 and either 'new slip' or not. In case of no new bet slip, each existing bet-on-mover-site in Draw 3 on the bet ticket automatically counts as a Draw 4 'simple' bet, the bettor may mark to select bet-on movers in additional sites 61 to bet on. The total hanging bet credit modified by selected percentage 99, referred to as r4, will be evenly applied to all Σ(#61(M)) Draw 4 'simple' bets. Every original \$a bet will be reduced to a \$a*(100−r2)%*(100−r3)%*(100−r4)% bet. The ticket as bet slip will be approved by the computer so that a revised ticket as shown in FIG. 2H. (Note that the drawings presented here do not include FIGS. 3H and 4H to show a possible revised 4-Draw ticket using bet slip as shown in FIGS. 3AA, 4AA). In addition to existing data the revised ticket shows selected credit percentage for Draw 4, and all new bet-on selections marked with "=". Besides, every bet-on mover will show up in gray to indicate its location determined by Draw 3. The bettor with no intention to make credit bets may submit a hanging bet ticket without any credit bet selection to obtain a revised ticket, which just updates Draw 3 outcomes by showing gray movers.

Regardless of after which Draw, in the case of selecting 'new slip', the bettor submits the ticket without any credit bet selection to receive a non-cashable credit voucher together with a revised bet ticket. On the revised ticket, selected credit percentage will show up, and Draw outcomes with gray movers will be printed. The non-cashable credit voucher shows besides credit amount an index y, which indicates a carryover inverse of the product of all winning probabilities in the submitted ticket. It can be used like cash for placing bets on a new slip. Later on in the calculation of payoff, house edge e(x) will be a function of x=y*z, where z is the inverse of the product of all winning probabilities in the new ticket.

Random Number Generator

The game requires a manipulation-proof random number generator to pick ruled movements. It can be a mechanical device like the one used at keno. While there a number on each ball, here a symbol representing one ruled movement. While there one bowl with 80 balls, here one bowl for each mover in which equally many, say, four or five balls for each movement. The generator can also be TIMER-function using a clock with 8,640,000 centi-seconds per day so that every centi-second is assigned to one movement such as it will be movement 'A' when 3,456,789 centi-seconds have elapsed since midnight. Which centi-second is assigned to which movement can be made known to the public. There is no fear of manipulation because pressing a button mechanically by a finger nobody is able to catch a desired elapsed centi-second of a day. Anyway, the generator must obviously produce all ruled movements equally probable at random.

Description of the Non-Automatic Game

The game requires at least one TV/computer monitor, several wagering machines connected to a data processing computer, printed paper bet slips and random number generators. Naturally, the connection between wagering machines and the computer can be wireless of any kind.

The game requires a player, called operator, to start by putting movers 12 in sites 11 arbitrarily as shown in FIGS. 2, 3 and 4. All other players, called bettors, use paper or on-screen slips as shown in FIGS. 2A, 3A, 3AA, 4A and 4AA to place bets as described above. At a preset time, independent of wagering activity, the operator uses random generators as described above to execute the first draw, called Draw #1, to move movers accordingly. The outcomes will be displayed on the monitor as shown in FIGS. 2, 3 and 4. Besides, in case of using playing surface as shown in FIG. 3 or 4, the display also includes FIG. 3' or 4' respectively. In FIG. 3' and 4', movers locate in gray sites before Draw and become gray after Draw. The outcomes will also be input into the computer to determine if any bet ticket contains selections matching the outcomes so that its holder can obtain payoff or credit.

Whether there is a draw in action or not, whether having placed bets before Draw #1 or not, any bettor can place bets anytime just like before Draw #1. Besides, it is an option that the hanging ticket holder can place credit bets as described above. At a preset time the operator executes the next draw, called Draw #2, for all movers. The outcomes will be displayed and data proceeded just like after Draw #1. As the flowchart in FIG. 1 shows, the above steps repeat. Unless pause or stop has been regulated ahead, the process will go on indefinitely, while any bettor may start or stop betting anytime. The Draw # will grow accordingly. But bettors don't need to pay attention to it. For the sake of reference, 'Draw 1 is Draw # so and so' will be printed on every bet ticket. A regulated stop must allow any existing multi-bets to reach final results.

Description of the Automatic Version

To play the automatic version, one needs a video game machine or personal computer equipped with made-to-order software inclusive random number generator such as the TIMER-function one described above to take care of drawing ruled movements. Other than the non-automatic game, every player is operator as well as bettor. Each draw is effective only to movers of the concerning playing surface. There will be no paper bet slip or ticket. But certainly as an option a printer can be connected to print out anything displayed on monitor. The hardware includes a pointing device or touch screen monitor for the player to make/mark selections.

The game starts with the display of a playing surface as shown in FIG. 2, 3 or 4 with additional icons/items named "Another playing surface", "Bet slip" and "Account".

Clicking any item on the display screen will either highlight it or result in a new display.

Clicking a highlighted item is to cancel that selection.

Clicking "Another playing surface" will result in the display of another one. All playing surfaces as shown in FIGS. 2 to 4, or maybe some one not given here, will be displayed cyclically one after another if clicking "Another playing surface" continues.

Clicking "Bet slip" will display a bet slip as shown in FIG. 2A, 3A, 3AA, 4A or 4AA with additional icons "Ticket" and "Account"; and furthermore "Alternative slip" in case of playing surface being as shown in FIG. 3 or 4.

Clicking "Alternative slip" will switch to a chain bet slip if the displayed one is for 1-Draw bet, or conversely. That is, switching between 3A and 3AA or 4A and 4AA.

The player places bets on screen just as on paper in the non-automatic game; then clicks "Ticket" to submit. If the submitted slip is incomplete or contains error, there will be a message such as 'Incomplete! Please select one per bet amount or total bet amount', requiring the bettor to make amendment. If the submission is approved, a bet ticket with a ticket number as shown in FIGS. 2B to 2E, 3B to 3E or 4B to 4E, with additional icons "Go back", "Cancel", "Draw" and "Account" will show up.

Facing a bet ticket:

Clicking "Go back" allows the player to return the submitted slip to make changes.

Clicking "Cancel" is to abandon the submitted slip and to request a blank bet slip.

Clicking "Account' will result in a display as shown in FIG. 5. It shows available balance, credit voucher data, all bet tickets with status and icons "Playing surface', "Bet slip" and "Exit".

Clicking "Draw" will cause a draw and computer data processing. Subsequently, the Draw 1 outcomes will automatically update the concerning bet ticket by painting bet-on movers in gray. Note that other than in non-automatic game, non-bet-on movers will neither show up nor be involved in the draw. After update with gray mover, "Go back" and "Cancel" disappear. There are three possibilities:

(1) In case of 1-Draw bet ticket or n-Draw one with no hanging bet, there will be an icon "Account".

(2) In case of 1-Draw bet ticket containing more than Draw 1, there will be icons "Draw" and "Account". The player can click "Draw" to execute another draw so that, whatever applicable, Draw 2 to 4 outcomes will automatically update the concerning bet ticket by painting bet-on movers in gray. Each time, "Account" remains available.

(3) In case of n-Draw bet ticket with hanging bets, there will be icons "Submit", "Draw" and "Account". The player can mark to make credit bet selections just as in the non-automatic game, and then click "Submit" to receive a revised ticket as in the non-automatic game as shown in FIG. 2F, 3F or 4F. The display of it will include icon "Draw" and "Account".

In case of using 'new slip', the player will see a message requiring to click "Account" and to click one credit voucher as fund for 'new slip' bets.

Facing an "Account" display as shown in FIG. 5:

Clicking a credit voucher will return to new slip display.

Clicking a certain ticket will return to the display of that ticket for viewing it or placing credit bets or executing a "Draw".

The display of any finished ticket includes icon "Account". The display of any unfinished 1-Draw ticket includes icons "Draw" and "Account". The display of any hanging n-Draw ticket includes icons "Submit", "Draw" and "Account".

The player continues just as in the non-automatic game, except that clicking "Draw" is required to execute a Draw. After a Draw, outcomes will automatically update the concerning bet ticket by painting bet-on movers in gray.

Clicking "Submit" on hanging bet ticket after selecting none or several credit bets is to submit it for approval. After approval, the icon "Submit" disappears so that the player can click "Draw" or "Account" to continue.

Facing an "Account" display and clicking "Playing surface" or "Bet slip" allows the bettor to continue in whichever way preferred, while "Exit" to end the game.

Calculation of Probabilities

There are 4 categories of probability formulae according to bet types and playing surfaces.

(1) 1-Draw 'jump' bets using slip as shown in FIG. 2A. Here we have w=7.

Although probabilities in this category are actually independent of which Draw, for practical purpose we need n=1 to 4 to specify Draw. Any Draw n 'simple' bet has winning probability pn=1/w. Any Draw n site' bet has winning probability pn=1/w^m, where m is the number of bet-on movers in that selected site of the concerning draw. Any Draw n 'mixed' bet has winning probability pn=1/w^m where m is the number of bet-on movers of the concerning draw.

(2) 1-Draw 'cylinder' bets using slip as shown in FIG. 3A. Here we have w=6.

Referring to FIG. 3, the identification of top border line 1001 with bottom border line 1002 allows us to assign any one of the ten sites with 1-dimensional coordinates x and others with coordinates x+i, where every calculation involving i or x is modulo 10 arithmetic. Now we can replace A, B, etc by x, x+1, etc. respectively.—For example, A:0, B:9, C:8, D:7, E:6, F:5, G:4, H:3, K:2, L:1.—And we can also say that x+i lies i sites away from x. A movement from 0 to i is equivalent to a movement from x to x+i. Thus, '00' moves a mover from x to x, defining a 1-movement path d1(0), 'U1' moves a mover from x to x+1, defining a 1-movement path d1(1), 'U2' moves a mover from x to x+2, defining a 1-movement path d1(2), 'U3' moves a mover from x to x+3, defining a 1-movement path d1(3), 'D1' moves a mover from x to x+9, defining a 1-movement path d1(9), 'D2' moves a mover from x to x+8, defining a 1-movement path d1(8).

There is no other 1-movement path d1(i).

Let #d1(i) denote the number of all d1(i) for i. Obviously, there are

#d1(0)=#d1(1)=#d1(2)=#d1(3)=#d1(8)=#d1(9)=1 and #d1(4)=#d1(5)=#d1(6)=#d1(7)=0; in total 6.

p1M=#d1(i(M))/w is the probability of mover M from its start location to get on a d1(i(M)) path to reach the site lying i(M) sites away. Here we need i(M) to specify i for the concerning M, though all i(M) are identical regardless of which M.

Let d2(i) be any d1(x) followed by any d1(i−x), defining a 2-movement path from any site to a site lying i sites away.

Let #d2(i) denote the number of all d2(i) for i. #d2(i) is the sum of #d1(x)*#d1(i−x) over all x. Explicitly, there are

#d2(0)=5, #d2(1)=6, #d2(2)=5, #d2(3)=4, #d2(4)=3, #d2(5)=2, #d2(6)=2, #d2(7)=2, #d2(8)=3, #d2(9)=4; in total 36, that is 6^2.

p2M#d2(i(M))/w^2 is the probability of mover M from its start location to get on a d2(i(M)) path to reach the site lying i(M) sites away. Here we need i(M) to specify i for the concerning M, though all i(M) are identical regardless of which M.

Let d3(i) be any d1(x) followed by any d2(i−x), defining a 3-movement path from any site to a site lying i sites away.

Let #d3(i) denote the number of all d3(i) for i. #d3(i) is the sum of #d1(x)*#d2(i−x) over all x.

Explicitly, there are

#d3(0)=25, #d3(1)=27, #d3(2)=27, #d3(3)=25, #d3(4)=22, #d3(5)=18, #d3(6)=16, #d3(7)=16, #d3(8)=18, #d2(9)=22; in total 216, that is 6^3.

p3M=#d3(i(M))/w^3 is the probability of mover M from its start location to get on a d3(i(M)) path to reach the site lying i(M) sites away. Here we need i(M) to specify i for the concerning M, though all i(M) are identical regardless of which M.

Let d4(i) be any d1(x) followed by any d3(i−x), defining a 4-movement path from any site to a site lying i sites away.

Let #d4(i) denote the number of all d4(i) for i. #d4(i) is the sum of #d1(x)*#d3(i−x) over all x. Explicitly, there are

#d4(0)=135, #d4(1)=144, #d4(2)=148, #d4(3)=144, #d4(4)=135, #d4(5)=124,

#d4(6)=115, #d4(7)=112, #d4(8)=115, #d4(9)=124; in total 1296, that is 6^4.

p4M=#d4(i(M))/w^4 is the probability of mover M from its start location to get on a d4(i(M)) path to reach the site lying i(M) sites away. Here we need i(M) to specify i for the concerning M, though all i(M) are identical regardless of which M.

A Draw n 'simple' bet, where n=1 to 4, on mover M lying i(M) sites away will be denoted by dn(i(M)). It has winning probability pn=pnM=#dn(i(M))/w^n.

A Draw n 'site' bet, where n=1 to 4, on movers M lying each i(M) sites away from site S will be denoted by dnS( . . . , i(?), . . . ), where ? goes from mover #1 to #6, and i(?) is i(M) if ? is a bet-on mover, otherwise '-' (a dash). For example, d3B(-,2,1,-,-,8) is a Draw 3 'site' bet on site B with bet-on movers #2, #3 and #6, lying respectively 2, 1 and 8 sites away from site B. Or, d4E(3,2,1,-,7,-) is a Draw 4 'site' bet on site E with bet-on movers #1, #2, #3 and #5, lying respectively 3, 2, 1 and 7 sites away from site E. The dnS( . . . , i(?), . . . ) bet has the winning probability of pn=Π(pnM), where multiplication is over all bet-on movers M in site S of Draw n.

A Draw n 'mixed' bet, where n=1 to 4, on movers M lying each i(M) sites away will be denoted by dnX( . . . , i(?), . . . ), where ? goes from mover #1 to #6, and i(?) is i(M) if ? is a bet-on mover, otherwise '-' (a dash). For example, d2X(2,5,-,-,-,6) is a Draw 2 'mixed' bet with bet-on movers #1, #2 and #6, lying respectively 2, 5 and 6 sites away. Or, d3X(-,-,3,2,3,-) is a Draw 3 'mixed' bet with bet-on movers #3, #4 and #5, lying respectively 3, 2 and 3 sites away. Or, d4X(-,(3,4),(2,1),-,-,(00)) is a Draw 4 'mixed' bet with bet-on movers #2, #3 and #6, lying respectively (3,4),(2,1) and (00) sites away. The dnS( . . . , i(?), . . . ) bet has the winning probability of pn=Π(pnM) where multiplication is over all bet-on movers of Draw n.

(3) 1-Draw 'torus' bets using slip as shown in FIG. 4A. Here we have w=9.

Referring now to FIG. 4, the identification of top border line 1001 with bottom border line 1002 and left border line 1003 with right border line 1004 allows us to assign any one of the twenty sites with matrix coordinates (x,y) and others with coordinates (x+i,y+j), where every calculation involving i or x is modulo 4 arithmetic, involving j or y is modulo 5 arithmetic. Now we can replace AA, AB, etc. by (x,y), (x,y+1) etc. respectively.—For example, AA:(0,0), AB:(0,1), AC:(0,2), AD:(0,3), AE:(0,4), BA:(1,0), BB:(1,1), BC:(1,2), BD:(1,3), BE:(1,4), CA:(2,0), CB:(2,1), CC:(2,2), CD:(2,3), CE:(2,4), DA:(3,0), DB:(3,1), DC:(3,2), DD:(3,3), DE:(3,4).—And we can also say that (x+i,y+j) lies (i,j) sites away from (x,y). A movement from (0,0) to (i,j) is equivalent to a movement from (x,y) to (x+i,y+j). Thus, '00' moves a mover from (x,y) to (x,y), defining a 1-movement path d1(0,0).

'E' moves a mover from (x,y) to (x,y+1), defining a 1-movement path d1(0,1)

'W' moves a mover from (x,y) to (x,y+4), defining a 1-movement path d1(0,4)

'N' moves a mover from (x,y) to (x+3,y), defining a 1-movement path d1(3,0).

'S' moves a mover from (x,y) to (x+1,y), defining a 1-movement path d1(1,0).

'NE' moves a mover from (x,y) to (x+3,y+1), defining a 1-movement path d1(3,1).

'SE' moves a mover from (x,y) to (x+1,y+1), defining a 1-movement path d1(1,1).

'NW' moves a mover from (x,y) to (x+3,y+4), defining a 1-movement path d1(3,4).

'SW' moves a mover from (x,y) to (x+1,y+4), defining a 1-movement path d1(1,4).

There is no other 1-movement path d1(i,j).

Let #d1(i,j) denote the number of all d1(i,j) paths from (0,0) to (i,j). Obviously, there are

#d1(0,0)=d1(0,1)=#d1(0,4)=#d1(1,0)=#d1(1, 1)=#d1(1,4)=#d1(3,0)=#d1(3,1)=#d1(3,4)=1 and #d1(i,j)=0 for all other (i,j); in total 9.

p1M=#d1(i(M),j(M))/w is the probability of mover M from its start location to get on a d1(i(M),j(M)) path to reach the site lying (i(M),j(M)) sites away. Here we need (i(M),j(M)) to specify (i,j) for the concerning M, though all (i(M),j(M)) are identical regardless of which M.

Let d2(i,j) be any d1(x,y) followed by any d1(i−x,j−y), defining a 2-movement path from any site to a site lying (i,j) sites away.

Let #d2(i,j) denote the number of all d2(i,j) paths from (0,0) to (i,j). #d2(i,j) is the sum of #d1(x,y)*#d1(i−x,j−y) over all x and y. Explicitly, there are

#d2(0,0)=9, #d2(0,1)=6, #d2(0,2)=3, #d2(0,3)=3, #d2(0,4)=6, #d2(1,0)=6,

#d2(1,1)=4, #d2(1,2)=2, #d2(1,3)=2, #d2(1,4)=4, #d2(2,0)=6, #d2(2,1)=4,

#d2(2,2)=2, #d2(2,3)=2, #d2(2,4)=4, #d2(3,0)=6, #d2(3,1)=4, #d2(3,2)=2,

#d2(3,3)=2, #d2(3,4)=4; in total 81, that is 9^2.

p2M=#d2(i(M),j(M))/w^2 is the probability of mover M from its start location to get on a d2(i(M),j(M)) path to reach the site lying (i(M),j(M)) sites away. Here we need (i(M),j(M)) to specify (i,j) for the concerning M, though all (i(M),j(M)) are identical regardless of which M.

Let d3(i,j) be any d1(x,y) followed by any d2(i−x,j−y), defining a 3-movement path from any site to a site lying (i,j) sites away.

Let #d3(i,j) denote the number of all d3(i,j) paths from (0,0) to (i,j). #d3(i,j) is the sum of #d1(x,y)*#d2(i−x,j−y) over all x and y. Explicitly, there are

#d3(0,0)=49, #d3(0,1)=42, #d3(0,2)=28, #d3(0,3)=28, #d3(0,4)=42, #d3(1,0)=49,

#d3(1,1)=42, #d3(1,2)=28, #d3(1,3)=28, #d3(1,4)=42, #d3(2,0)=42, #d3(2,1)=36,

#d3(2,2)=24, #d3(2,3)=24, #d3(2,4)=36, #d3(3,0)=49, #d3(3,1)=42, #d3(3,2)=28,

#d3(3,3)=28, #d3(3,4)=42, in total 729, that is 9^3.

p3M#d3(i(M),j(M))/w^3 is the probability of mover M from its start location to get on a d3(i(M),j(M)) path to reach the site lying (i(M),j(M)) sites away. Here we need (i(M),j(M)) to specify (i,j) for the concerning M, though all (i(M),j(M)) are identical regardless of which M.

Let d4(i,j) be any d1(x,y) followed by any d3(i−x,j−y), defining a 4-movement path from any site to a site lying (i,j) sites away.

Let #d4(i,j) denote the number of all d4(i,j) paths from (0,0) to (i,j). #d4(i,j) is the sum of #d1(x,y)*#d3(i−x,j−y) over all x and y. Explicitly, there are

#d4(0,0)=399, #d4(0,1)=357, #d4(0,2)=294, #d4(0,3)=294, #d4(0,4)=357,

#d4(1,0)=380, #d4(1,1)=340, #d4(1,2)=280, #d4(1,3)=280, #d4(1,4)=340,

#d4(2,0)=380, #d4(2,1)=340, #d4(2,2)=280, #d4(2,3)=280, #d4(2,4)=340,

#d4(3,0)=380, #d4(3,1)=340, #d4(3,2)=280, #d4(3,3)=280, #d4(3,4)=340; in total 6561, that is 9^4.

p4M=#d4(i(M),j(M))/w^4 is the probability of mover M from its start location to get on a d4(i(M),j(M)) path to reach the site lying (i(M),j(M)) sites away. Here we need (i(M),j(M)) to specify (i,j) for the concerning M, though all (i(M),j(M)) are identical regardless of which M.

A Draw n 'simple' bet, where n=1 to 4, on mover M lying each (i(M),j(M)) sites away will be denoted by dn((i(M),j(M)). It has winning probability pn=pnM.

A Draw n 'site' bet, where n=1 to 4, on movers M lying each (i(M),j(M)) sites away from site S will be denoted by dnS( . . . ,(i(?),j(?)), . . . ), where ? goes for each (i,j) from movers #1 to #6, and (i(?),j(?)) is (i(M),j(M)) if ? is a bet-on mover, otherwise '-' (a dash). For example, d3BB(-,(2,3),(3,1),-,-,(0,4)) is a Draw 3 'site' bet on site BB with bet-on movers #2, #3 and #6, lying respectively (2,3),(3,1) and (0,4) sites away from site BB. Or, d4DA((3,3),(0,2),(1,1),-,(0,0),-) is a Draw 4 'site' bet on site DA with bet-on movers #1, #2, #3 and #5, lying respectively (3,3),(0,2),(1,1) and (0,0) sites away from site DA. The dnS( . . . ,(i(?),j(?)), . . . ) bet has winning probability pn=Π(pnM), where multiplication is over all bet-on movers M in site S of Draw n.

A Draw n 'mixed' bet, where n=1 to 4, on movers M lying each (i(M),j(M)) sites away will be denoted by dnX( . . . ,(i(?),j(?)), . . . ), where ? goes for each (i,j) from mover #1 to #6, and (i(?),j(?)) is (i(M),j(M)) if ? is a bet-on mover, otherwise '-' (a dash). For example, d2X((3,2),(2,3),-,-,-,(1,1)) is a Draw 2 'mixed' bet with bet-on movers #1, #2 and #6, lying respectively (3,2),(2,3) and (1,1) sites away. Or, d3X(-,-,(0,3),(1,2),(3,4),-) is a Draw 3 'mixed' bet with bet-on movers #3, #4 and #5, lying respectively (0,3),(1,2) and (3,4) sites away. The dnX( . . . ,(i(?),j(?)), . . . ) bet has winning probability pn=Π(pnM), where multiplication is over all bet-on movers M of Draw n.

(4) n-Draw 'chain' bets for n=2 to 4. Here we have w=7, 6 or 9 in case of using bet slip as shown in FIG. 2A, 3AA or 4AA respectively.

A 2-Draw bet with m bet-on movers has probability p=1/w^m to become hanging, and probability p=1/w^2m to win.

A 3-Draw bet with m bet-on movers has probability p=1/w^m to become hanging, and probability p=1/w^2m to remain hanging, and probability p=1/w^3m to win.

A 4-Draw bet with m bet-on movers has probability p=1/w^m to become hanging, and probability p=1/w^2m to remain hanging, and probability p=1/w^3m to remain hanging once more, and probability p=1/w^4m to win.

Besides, a ticket has probabilities:

p1=Π(#31(M))/w^m to be hanging after Draw 1, then p2=Π(#41(M))/w^m to win or remain hanging after Draw 2, then p3=Π(#51(M))/w^m and p4=Π(#61(M))/w^m to win or remain hanging after Draw 3, then p4=Π(#61(M))/w^m to win at Draw 4.

House Edges, Payoffs and Credits

This game requires reasonable house edges such as follows: Let x be the inverse of the product of winning probabilities of all involved draws.

$$e(x)=2.5+x/4 \text{ for } 1\le x\le 10$$

$$e(x)=4+(n+1)[n/2+(x-10\hat{\ }n)/9(10\hat{\ }n)] \text{ for } 10<x \text{ with integer } n \text{ satisfying } 10\hat{\ }n<x\le 10\hat{\ }(n+1).$$

For 1-Draw bets with winning probabilities p1 to p4 of Draw 1 to 4 respectively as declared in 'Calculation of probabilities' according to playing surfaces being used:

A winning $a Draw 1 1-Draw bet pays $a*(100−e(1/p1))%/p1.

A winning $a Draw 2 1-Draw bet pays $a*(100−e(1/p2))%/p2.

A winning $a Draw 3 1-Draw bet pays $a*(100−e(1/p3))%/p3.

A winning $a Draw 4 1-Draw bet pays $a*(100−e(1/p4))%/p4.

For multi-draw bets with m bet-on movers let r2, r3 and r4 be the percentage points of credit selected by the bettor for Draw 2, 3 and 4 respectively.

A winning $a 2-Draw bet pays $a*(100−r2)%*(100−e(w^2m))%/w^2m.

A winning $a 3-Draw bet pays $a*(100−r2)%(100−r3)%*(100−e(w^3m))%/w^3m.

A winning $a 4-Draw bet pays $a*(100−r2)%*(100−r3)%*(100−r4)%*(100−e(w^4m))%/w^4m In the case of calculating credits and credit bet payoffs, we use the total amount of a ticket rather than per bet amount. Let $aa be the total bet amount on a ticket.

After Draw 1, a hanging $aa ticket earns total credit $aa/p1. Each winning Draw 2 credit 'simple' bet pays $aa*r2%*w*(e(w^(m+1)))/(p1*Σ(#41(M))).

After Draw 2, a hanging $aa ticket earns total credit $aa*(100−r2)%/(p1*p2). Each winning Draw 3 credit 'simple' bet pays $aa*(100−r2)%*r3%*w*(e(w^(2m+1)))/(p1*p2*Σ(#51(M))).

After Draw 3, a hanging $aa ticket earns total credit $aa*(100−r2)%*(100−r3)%/(p1*p2*p3).

Each winning Draw 4 credit 'simple' bet pays $aa*(100−r2)%*(100−r3)%*r4%*w*(e(w^(3m+1)))/(p1*p2*p3*Σ(#61(M))).

NUMERICAL EXAMPLES

In order to make calculations less complex, no house edge will be applied below.

In the 'simple' bet ticket as shown in FIG. 2B, in any Draw n, every bet has probability pn=1/7 to win payoff $2/pn=$14.

In the 'simple' ticket as shown in FIG. 3B, in Draw 1, every bet has probability p1=1/6, to win $2/p1=$12; in Draw n, where n=2 to 4, every dn(i(M)) bet has probability pn=#dn(i(M))/w^n to win payoff $2/pn. For example, d2(8(3)) bet has p2=3/6^2; d3(4(4)) bet has p3=22/6^3; d4(2(2)) bet has p4=148/6^4.

In the 'simple' ticket as shown in FIG. 4B in Draw 1, every bet has probability p1=1/9 to win $1/p1=$9; in Draw n, where n=2 to 4, every dn(i(M), j(M)) bet has probability pn=#dn(i(M),j(M))/w^n to win payoff $1/pn. For example, d2(0(2),1(2)) bet has p2=6/9^2; d3(2(5),1(5)) bet has p3=36/9^3; d4(3(6),3(6)) bet has p4=280/9^4.

In the 'site' ticket as shown in FIG. 2C, in any Draw n, every bet has probability pn=1/7^m, where m is the number of bet-on movers in the selected site, to win payoff $2/pn. For example, in Draw 1, Site 'D' bet has probability p1=1/7^3, in Draw 2, Site 'C' bet has probability p2=1/7^2, in Draw 3, Site 'F' bet has probability p3=1/7^2, in Draw 4, Site 'B' bet has probability p4=1/7^3.

In the 'site' ticket as shown in FIG. 3C, every dnS( . . . , i(M), . . . ) bet, where n=1 to 4, has probability pn=Π(pnM), where multiplication is over all bet-on movers M of Draw n, to win payoff $2/pn. For example, d1C(1,-,-,0,-) bet has p1=#d1(1)*#d1(0)/6^2=1/6^2; d2H(6,0,8,3,0,0) bet has p2=#d2(6)*#d2(8)*#d2(3)/6^(2*3)=2*3*4/6^6; d3G(7,1,9,4,-,-) bet has p3=#d3(7)*#d3(1)*#d3(9)*#d3(4)/6^(3*4)=16*27*22*25/6^12; d4F(8,-,0,5,7,0) bet has p4=#d4(8)*#d4(0)*#d4(5)*#d4(7)*#d4(0)/6^(4*5)=115*135*112*124*135/6^20.

In the 'site' ticket as shown in FIG. 4C, every dnS( . . . ,(i(M),j(M)), . . . ) bet, where n=1 to 4, has probability pn=Π(pnM), where multiplication is over all bet-on movers M in site S, to win payoff $2/pn. For example, d1BB((3,4),-,-,(3,1),(1,0),-) bet has p1=#d1(3,4)*#d1(3,1)*#d1(1,0)/9^3=1/9^3; d2CB(-,-,(1,2),-,(2,0),-) bet has p2=#d2(1,2)*#d2(2,0)/9^(2*2)=2*6/9^4; d3BA((1,2),-,-, -,-,(2,2)) bet has p3=#d3(1,2)*#d3(2,2)/9^(3*2)=28*24/9/6; d4DE((3,1),-,(2,0),-,-,(0,1)) bet has p4=#d4(3,1)*#d4(2,0)*#d4(0,1)/9^(4*3)=340*380*357/9^12.

In the 'mixed' ticket as shown in FIG. 2D, every bet, in Draw 1, has probability p1=1//7^4 to win payoff $100/(p1*Π(p1M)), where Π(p1M)=6*5*5*6=900; in Draw 2 probability p2=1/7^5 to win payoff $100/(p2*Π(p2M)), where Π(p2M)=5*5*6*6*5=3600; in Draw 3 probability p3=1/7^5 to win payoff $100/(p3*Π(p3M)), where Π(p3M)=5*6*5*4*6=3000; in Draw 4 probability p4=1/7^4 to win payoff $100/(p1*Π(p4M)), where Π(p4M)=6*4*4*6=576.

In the 'mixed' ticket as shown in FIG. 3D, every dnX( . . . ,i(M), . . . ) bet, where n=1 to 4, has probability pn=Π(pnM), where multiplication is over all bet-on movers M of the concerning draw, to win payoff $0.10/pn. For example, d1X(0,-,1,3,-,9) bet has p1=#d1(0)*#d1(1)*#d1(3)*#d1(9)/6^4=(1*1*1*)/6^4; d2X(1,4,-,8,7,6) bet has p2=#d2(1)*#d2(4)*#d2(8)*#d2(7)*#d2(2) [/6^(2*5)=6*3*3*2*2/6^10; d3X(-,3,8,-,5,1) bet has p3=#d3(3)*#d3(8)*#d3(5)*#d3(1)/6^(3*4)=25*18*18*27/6^12; d4X(-,1,9,3,0,2) bet has p4=#d4(1)*#d4(9)*#d4(3)*#d4(0)*#d4(2)/6^(4*5)=144*124*144*135*148/6^2

In the 'mixed' ticket as shown in FIG. 4D, every dnX( . . . ,(i(M),j(M)), . . . ) bet, where n=1 to 4, has probability pn=Π(pnM), where multiplication is over all bet-on movers of that draw, to win payoff $0.10/pn. For example, d1X((3,4),-,(3,0),(1,0),(3,4),-) bet has p1 #d1(3,4)*#d1(3,0)*#d1(1,0)*#d1(3,4)/9^4=1*1*1*1/9^4; d2X(-,(3,0),-,-,(2,1),-) bet has p2=#d2(3,0)*#d2(2,1)/9^(2*2)=6*4/9^4; d3X((2,1),-,-,-,(0,0),(0,3) bet has p3=#d3(2,1)*#d3(0,0)*#d3(0,3)/9^(3*3)=26*49*28/9^9; d4X((1,4),(3,1),-,(0,3),-,(3,3)) bet has p4=#d4(1,4)*#d4(3,1)*#d4(0,3)*#d4(3,3)/9^(4*4)=340*340*294*280/9^16.

The 4-Draw ticket as shown in FIG. 2E—here w=7—has probability p1=4*4*5*5/7^4=400/2401 to become hanging and earn Draw 2 credit $200/p1=$1,200.50; then probability p2=3*2*4*4/7^4=96/2401 to remain hanging, and earn Draw 3 credit $200*(100−r2)%/(p1*p2); then probability p3=3*4*3*3/w^4=108/2401 to remain hanging, and earn Draw 4 credit $200*(100−r2)%*(100−r3)%/(p1*p2*p3); and finally probability p4=2*2*2*2/w^4=16/2401 to win payoff $200*(100−r2)%*(100−r3)%*(100−r4)%/(p1*p2*p3*p4); which is $100,166,770.86 if r2=r3=r4=0. All p1 to p4 hold in revised tickets.

The revised 4-Draw ticket as shown in FIG. 2F with Σ(#41(M)))=23 credit 70% bets contains four credit bet winners, each paying $200*70%*7/(p1*23)=$255.76. It also has probability p2 to earn Draw 3 credit $200*(100−70)%/(p1*p2)=$9,007.50; and then probability p3 to remain hanging and earn Draw 4 credit $200*(100−70)%*(100−r3)%/(p1*p2*p3).

The revised 4-Draw ticket as shown in FIG. 2G with Σ(#51(M)))=25 credit 60% bets contains four credit bet winners, each paying $200*70%*60%*7/(p1*p2*25)=$1513.26. It also has probability p3 to earn Draw 4 credit $200*(100−70)%*(100−60)%/(p1*p2*p3)=$80,100.04.

The revised 4-Draw ticket as shown in FIG. 2H with Σ(#61(M)=28 credit 80% bets will result in four credit bet winners, each paying $200*(100−70)%*(100−60)%*80%*7/(p1*p2*p3*28)=$16,200.16. It also has probability p4 to win payoff $200*(100−70)%*(100−60)%*(100−80)%/(p1*p2*p3*p4)=$2,404,002.60 on one original bet.

The 3-Draw ticket as shown in FIG. 3E—here w=6—has probability p1=5*5*5*5*5/6^5=35/7776 to become hanging and earn Draw 2 credit $200/p1=$497.66; then probability p2=4*4*4*4*4/6^5=1024/7776 to remain hanging, and earn Draw 3 credit \$200*(100−r2)%/(p1*p2); and finally probability p3=3*2*3*2*3/6^5=108/7776 to win payoff \$200*(100−r2)%*(100−r3)%/(p1*p2*p3); which is \$272,097.79 if r2=r3=0. All p1 to p3 hold in revised tickets.

The revised 3-Draw ticket as shown in FIG. 3F with Σ(#41 (M))=30 credit 70% bets assures five credit bet winners, each paying \$200*70%*6/(p1*30)=\$69.67. It also has probability p2 to earn Draw 3 credit \$200*(100−70)%/(p1*p2)=\$113.37.

The revised 3-Draw ticket as shown in FIG. 3G with Σ(#51 (M))=30 credit 80% bets assures five credit bet winners, each paying \$200*(100−70)%*80%*6/(p1*p2*30)=\$11.32. It also has probability p3 to win payoff \$200*%*(100−70)*%*(100−80)/(p1*p2*p3)=\$16,325.87 on one original bet.

The 3-Draw ticket as shown in FIG. 4E—here w=9—has probabilty p1=8*8*8*7/9^4=4704/6561 to become hanging, and earn Draw 2 credit \$200/p1=\$278.95; then probability p2=7*7*6*6/9^4=1764/6561 to remain hanging, and earn Draw 3 credit \$200*(100−r2)%/(p1*p2); and finally probability p3=6*5*5*5/9^4=750/6561 to win payoff \$200*(100−r2)%*(100−r3)%/(p1*p2*p3); which is \$9,076.39 if r2=r3=0. All p1 to p3 hold in revised tickets.

The revised 3-Draw ticket as shown in FIG. 4F with Σ(#41 (M))=35 credit 60% bets contains four credit bet winners, each paying \$200*60%*9/(p1*35)=\$43.04. It also has probability p2 to earn Draw 3 credit \$200*(100−60)%/(p1*p2)−\$415.02.

The revised 3-Draw ticket as shown in FIG. 4G with Σ(#51 (M))=34 credit 70% bets will result in two to four credit bet winners, each paying \$200*(100−60)%*70%*9/(p1*p2*34)=\$76.90. It also has probability p3 to win payoff \$200*%*(100−60)*%*(100−70)/(p1*p2*p3)=\$1,089.17 on one original bet.

Now a simple example of using house edges e(1/p):

Let the playing surface be FIG. 2 and budget \$80. I'll play no more than two Draws according to plan (1) plus (2) depending on weather and where #1 and #2 go in Draw 1.

(1) If it doesn't rain, then I place 4 \$20 1-Draw 'mixed' bets on movers #1 and #2 moving to sites A or B in Draw1. In this case, p=(1/7)^2, n−1, e(1/p)=5.87, there are 4 chances out of 49 to earn payoff \$20*(1/p)*(100−e)%=\$922.47.

In case of winning and good weather, I go somewhere to spend the profit.

In case of winning and starting to rain, I continue as follows, (1a) or (1b):

(1a) If Draw1 put both #1 and #2 to the same site, then (1a1) plus (1a2):

(1a1) I use 20% of \$922.47 to place 4 'mixed' bets on movers #1 and #2 moving to sites A or B. In this case, p=(1/7)^2, n=11, e(1/p)=5.87, there are 4 chances out of 49 to earn payoff \$(922.47/4)*20% (1/p)*(100−e)%=\$2260.06*0.9413=\$2124.33.

(1a2) I use 80% of \$922.47 to place 'simple' bets on #1 and #2 moving to any site. In this case, p=1/7, n=0, e(1/p)=4.25, there are always two payoffs of \$(922.47/14)*80%*(1/p)*(100−e)%=\$353.30.

(1b) If Draw1 put #1 and #2 to different sites, then (1b1) plus (1b2):

(1b1) I use 40% of \$922.47 to place 4 'mixed' bets on movers #1 and #2 moving to sites A or B. In this case, p=(1/7)^2, n=1, e(1/p)=5.87, there are 4 chances out of 49 to earn payoff \$(922.47/4)*40%*(1/p)*(100−e)%=\$4248.66.

(1b2) I use 60% of \$922.47 to place 'simple' bets on #1 and #2 moving to any site. In this case, p=1/7, n=0, e(1/p)=4.25, there are always two payoffs of \$(922.47/14)*60%*(1/p)*(100−e)%=\$264.98.

(2) If it rains, then I place 16 \$5 2-Draw 'chain' bets on movers #1 and #2 moving to sites A or B in each Draw. Here, p1=(1/7)^2, there are 4 chances out of 49 to be hanging, each with total credit 4*\$5*(1/p1)=\$980.00.

In case of hanging, I continue as follows, (2a) or (2b), to ensure a winner:

(2a) If Draw1 put both #1 and #2 to the same site, then (2a1) plus (2a2):

(2a1) I use 80% of credit \$980.00 to place Draw 2 'simple' bets on #1 and #2 moving to any site. In this case, p2=1/7, n=2, e(1/p1*p2)=7.81, there are always two payoffs of \$(980.00/14)*80% (1/p2)*(100−e)%=\$361.38.

(2a2) I keep 20% of credit \$980.00 for the original bets. In this case, p2=(1/7)^2, n=3, e(1/p1*p2)=10.62, there are 4 chances out of 49 to earn payoff \$(980.00/4)*20%*(1/p2)*(100−e)%=\$2146.01.

(2b) If Draw1 put #1 and #2 to different sites, then (2b1) plus (2b2):

(2b1) I use 60% of credit \$980.00 to place Draw 2 'simple' bets on #1 and #2 moving to any site. In this case, p2=1/7, n=2, e(1/p1*p2)=7.81, there are always two payoffs of \$(980.00/14)*60%*(1/p2)*(100−e)%=\$271.04.

(2b2) I keep 40% of credit \$980.00 for the original bets. In this case, p2=(1/7)^2, n=3, e(1/p1*p2)=10.62, there are 4 chances out of 49 to earn payoff \$(980.00/4)*80%*(1/p2)*(100−e)%=\$4292.02.

Although (1) and (2) have everywhere the same winning probabilities, there are different gains due to house edge being applied twice or once. House edge applied only to payoff encourages bettors to place multi-draw 'chain' bets. By a simple scientific plan as shown in (2a1) and (2b1), a hanging bet holder can always become a sure winner.

CONCLUSION

The invention described above provides an extremely low operation cost game to be easily run by an existing or future keno/lottery kind of operator.

The game of invention is basically distinct from today's casino slot/video games due to the fact that all possible outcomes with their corresponding probabilities are made known to the public and that it uses obviously manipulation-proof random number generators. However, the automatic version can be integrated into an existing video game machine where a TIMER-function random number generator will be installed instead of RNG software protecting casino's profit.

The derivation of some probabilities involves modular arithmetic to produce #d1(i) to #d4(i) and #d1(i,j) to #d4(i,j). Their values are explicitly provided. Thus, the operator and players all can see the arithmetic and just let the computer apply those values. Besides, there are examples to help everyone get acquaintance with practical calculations.

To make the bettor no regret, every hanging bet earns non-cashable credit equal to the payoff value without house edge. The holder can use it scientifically to result in a winner. The operator can make house edge effective on the final payoff. Charging house edge only on final payoff makes purchasing a multi draw ticket more incentive than tickets draw by draw. Besides, house edge should be on a whole ticket instead of each single bet, and based on the ratio of payoff to the total bet amount to allow lower ratio tickets enjoy lower house edges. Naturally, setting house edges is not inventor's business, but the game's popularity depends on reasonable house edges such as provided above. Knowing all possible outcomes with corresponding probabilities and fair house edges is essential for people tempting to beat the house.

Besides, the operator can always by the way run contest such as follows: Anyone paying an entry fee gets a non-cashable voucher for say $1M to play. The player must make a number of certain kinds of bets, including some credit ones. Every payoff will be added to the voucher. Reaching a certain winning results will grant the player a prize, which may include some percentage of the voucher. The computer can handle contestants like regular bettors.

Due to the fact that up to the moment of a concerning draw it doesn't matter when any selection is made or changed, there can be an option to allow the bettor to change selections any time before the draw. The bettor may even purchase a ticket stating the number of certain kinds of bets without specific selections and submit the details anytime ahead of the concerning draw. Computer random betting selections may also be made available as an option.

There are only three similar playing surfaces with ruled movements given here But obviously the method can be applied to many other similar playing surfaces with other similar ruled movements. The number of sites and movers can easily be made different from those given above. Ruled movements can be different for different movers on the same playing surface.

Other types of betting can be added into the game. Chain bets can be more than 4 draws and other than combining mixed bits.

Thus, the scope of the invention should be determined by the appended claims and their legal equivalents, rather than by examples given.

I claim:

1. A method to operate a movement game allowing players to bet on any one or more of millions of completely predictable outcomes, comprising:

providing a plurality of moving pieces called movers on a playing surface called a site map consisting of sites, said movers and said site map being displayed on monitors and printed on bet slips, providing a plurality of ruled movements, providing one drawing device for each said mover to draw any one of said plurality of ruled movements equally probable at random, said drawing devices being scheduled to draw said ruled movements for all said movers one draw after another, drawing activities being video displayed on monitors, allowing players to mark said bet slips, where a marked said mover is called a bet-on mover and a said site on which there is at least one marked mover is called a selected site, allowing players to place bets comprising:

draw 1 simple bet: a bet-on mover will move to a selected site by the upcoming draw of ruled movements;

draw 2 simple bet: a bet-on mover will move to a selected site by two upcoming draws of ruled movements;

draw 3 simple bet: a bet-on mover will move to a selected site by three upcoming draws of ruled movements;

draw 4 simple bet: a bet-on mover will move to a selected site by four upcoming draws of ruled movements;

draw 1 site bet: a plurality of bet-on movers will completely move to a selected site by the upcoming draw of ruled movements;

draw 2 site bet: a plurality of bet-on movers will completely move to a selected site by two upcoming draws of ruled movements;

draw 3 site bet: a plurality of bet-on movers will completely move to a selected site by three upcoming draws of ruled movements;

draw 4 site bet: a plurality of bet-on movers will completely move to a selected site by four upcoming draws of ruled movements;

draw 1 mixed bet: each of all bet-on movers will move to a selected site by the upcoming draw of ruled movements;

draw 2 mixed bet: each of all bet-on movers will move to a selected site by two upcoming draws of ruled movements;

draw 3 mixed bet: each of all bet-on movers will move to a selected site by three upcoming draws of ruled movements;

draw 4 mixed bet: each of all bet-on movers will move to a selected site by four upcoming draws of ruled movements;

2-draw bet: each of all bet-on movers will move to a selected site by the upcoming draw of ruled movements, and then to a selected site by the subsequent draw of ruled movements;

3-draw bet: each of all bet-on movers will move to a selected site by the upcoming draw of ruled movements, and then to a selected site by the subsequent draw of ruled movements, and then to a selected site by the second subsequent draw of ruled movements;

4-draw bet: each of all bet-on movers will move to a selected site by the upcoming draw of ruled movements, and then to a selected site by the subsequent draw of ruled movements, and then to a selected site by the second subsequent draw of ruled movements, and then to a selected site by the third subsequent draw of ruled movements;

submitting marked bet slips to wagering machines for issuing bet tickets, calculating payoff of a winning be without house edge based on bet amount and winning probability.

2. The method of claim 1 wherein keno bowls being used as said drawing devices.

3. The method of claim 1 and further comprising said 2-draw, 3-draw or 4-draw bet being defined as hanging if it stays in a position to become winning after the last draw of ruled movements, calculating credit for a hanging bet based on bet amount and hanging probability, allowing hanging bet ticket holder to select percentage of said credit to place bets without additional wagering money.

4. The method of claim 1 and further comprising:

using particular house edge functions to calculate actual payoff of a bet based on bet amount and winning probability.

5. The method of claim 1 and further comprising computerized means for displaying and marking said bet slips, and using a TIMER-function random number generator as said drawing device.

6. The method of claim 3 and further comprising computerized means for displaying and marking said bet slips, and using a TIMER-function random number generator as said drawing device.

7. The method of claim 4 and further comprising computerized means for displaying and marking said bet slips, and using a TIMER-function random number generator as said drawing device.

* * * * *